(12) United States Patent
Choi et al.

(10) Patent No.: US 11,747,620 B2
(45) Date of Patent: Sep. 5, 2023

(54) BACKLIGHT UNIT AND HOLOGRAPHIC DISPLAY APPARATUS INCLUDING THE SAME

(71) Applicant: SAMSUNG ELECTRONICS CO., LTD., Suwon-si (KR)

(72) Inventors: Chilsung Choi, Suwon-si (KR); Hoon Song, Yongin-si (KR); Hongseok Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 703 days.

(21) Appl. No.: 16/810,403

(22) Filed: Mar. 5, 2020

(65) Prior Publication Data

US 2021/0088788 A1    Mar. 25, 2021

(30) Foreign Application Priority Data

Sep. 24, 2019  (KR) .................... 10-2019-0117489

(51) Int. Cl.
*G02B 27/01* (2006.01)
*F21V 8/00* (2006.01)

(52) U.S. Cl.
CPC ....... *G02B 27/0172* (2013.01); *G02B 6/0065* (2013.01); *G02B 6/0078* (2013.01);
(Continued)

(58) Field of Classification Search
None
See application file for complete search history.

(56) References Cited

U.S. PATENT DOCUMENTS 10,191,196 B2   1/2019  Morozov et al.
2017/0131551 A1  5/2017  Robbins et al.
(Continued)

FOREIGN PATENT DOCUMENTS

KR   10-2020-0132568 A   11/2020
WO      2018111895 A1    6/2018

OTHER PUBLICATIONS

Goodman, J. W., "Coherence of Optical Waves", Handbook on Speckle5, Cross-Spectral Purity, Multimedia Processing Lab, Aug. 14, 2000, pp. 187-189 (3 pages).
(Continued)

*Primary Examiner* — Chris H Chu
(74) *Attorney, Agent, or Firm* — Sughrue Mion, PLLC

(57) ABSTRACT

Provided a backlight unit including a light source and a light guide structure configured to guide the light emitted from the light source, the light guide structure includes a first coupler layer including a first output coupler configured to expand light in a first direction and output the expanded light in the first direction to the outside of the light guide structure, and a first expansion coupler configured to expand the light in a second direction perpendicular to the first direction and provide the expanded light in the second direction to the first output coupler, and a second coupler layer including a second output coupler configured to expand light in the first direction and output the expanded light to the outside of the light guide structure, and a second expansion coupler configured to expand light in the second direction and provide the expanded light to the second output coupler.

26 Claims, 24 Drawing Sheets

(52) U.S. Cl.
CPC ............... *G02B 2027/0174* (2013.01); *G02B 2027/0178* (2013.01)

(56) References Cited

U.S. PATENT DOCUMENTS

| | | | |
|---|---|---|---|
| 2017/0237974 A1* | 8/2017 | Samec ................. | H04N 13/122 348/53 |
| 2018/0032030 A1 | 2/2018 | Kim et al. | |
| 2018/0156962 A1* | 6/2018 | Kim ....................... | G02B 30/33 |
| 2018/0284440 A1 | 10/2018 | Popovich et al. | |
| 2018/0364409 A1 | 12/2018 | Lee et al. | |
| 2020/0150587 A1 | 5/2020 | Choi et al. | |
| 2020/0363578 A1 | 11/2020 | Choi et al. | |
| 2021/0239984 A1* | 8/2021 | Popovich ............. | G02B 5/1866 |

OTHER PUBLICATIONS

Communication dated Jun. 5, 2020, from the European Patent Office in counterpart European Application No. 20165637.8.

\* cited by examiner

BACKLIGHT UNIT AND HOLOGRAPHIC DISPLAY APPARATUS INCLUDING THE SAME

CROSS-REFERENCE TO RELATED APPLICATION

This application claims priority from Korean Patent Application No. 10-2019-0117489, filed on Sep. 24, 2019, in the Korean Intellectual Property Office, the disclosure of which is herein incorporated by reference its entirety.

FIELD

Example embodiments of the present disclosure relate to a backlight unit and a holographic display apparatus including the backlight unit, and more particularly, to a backlight unit capable of providing uniform illumination light and a holographic display apparatus including the backlight unit.

DESCRIPTION OF THE RELATED ART

A glasses method and a non-glasses method have been widely commercialized and used for implementing a three-dimensional image. The glasses method may include a polarized glasses method and a shutter glasses method, and the non-glasses method may include a lenticular method and a parallax barrier method. These methods use the binocular parallax of the two eyes, but have a limitation in an increase of the number of viewpoints and may create a sense of fatigue to a viewer because a sense of depth recognized by the brain does not match the focal point of the eyes.

A holographic display method is gradually used as a three-dimensional image display method in which the sense of depth recognized by the brain and the focal point of eyes are matched with each other and full parallax may be provided. The holographic display method uses a principle to reproduce an image of the original object by irradiating and diffracting reference light to a holographic pattern that records interference fringes obtained by allowing object light reflected from the original object and the reference light to interfere with each other. The currently used holographic display method provides a spatial light modulator with a computer generated hologram (CGH), rather than a holographic pattern obtained by directly exposing the original object, as an electric signal. As the spatial light modulator forms a holographic pattern to diffract the reference light according to an input CGH signal, a three-dimensional image may be generated.

The holographic display apparatus may include a backlight unit for providing illumination light to the spatial light modulator. The backlight unit used in the holographic display apparatus has coherence and provides collimated illumination light to the spatial light modulator. The collimated coherent illumination light provided by the backlight unit may be diffracted by the spatial light modulator, thereby forming a holographic image.

SUMMARY

One or more example embodiments of the present disclosure relate to a backlight unit and a holographic display apparatus including the backlight unit.

According to an aspect of an example embodiment, there is provided a backlight unit including a light source configured to emit light, and a light guide structure configured to guide the light emitted from the light source, the light guide structure including a first coupler layer, and a second coupler layer facing the first coupler layer, wherein the first coupler layer includes a first output coupler configured to expand light traveling inside the light guide structure in a first direction and output the expanded light in the first direction to the outside of the light guide structure, and a first expansion coupler configured to expand the light traveling inside the light guide structure in a second direction perpendicular to the first direction and provide the expanded light in the second direction to the first output coupler, and wherein the second coupler layer includes a second output coupler configured to expand light traveling inside the light guide structure in the first direction and output the expanded light to the outside of the light guide structure, and a second expansion coupler configured to expand light traveling inside the light guide structure in the second direction and provide the expanded light to the second output coupler.

The first output coupler may face the second output coupler, and the first expansion coupler faces the second expansion coupler.

The first expansion coupler may be configured to couple light incident at a first angle and provide the coupled light to the first output coupler, and to transmit light incident at an angle different from the first angle, and the second expansion coupler may be configured to couple light incident at a second angle different from the first angle and provide the coupled light to the second output coupler, and to transmit light incident at an angle different from the second angle.

The first angle and the second angle may have the same size and opposite signs with respect to a surface normal to the light guide structure.

The first expansion coupler may be disposed adjacent to a side surface of the first output coupler in the first direction, and the second expansion coupler may be disposed adjacent to a side surface of the second output coupler in the first direction.

The light guide structure may further include a first input coupler disposed adjacent to a first side surface of the second expansion coupler in the second direction and configured to provide light to the first side surface of the second expansion coupler, and a second input coupler disposed adjacent to a second side surface of the second expansion coupler in the second direction and configured to provide light to the second side surface of the second expansion coupler.

The first input coupler and the second input coupler may be disposed in the first coupler layer.

The first input coupler may be disposed in the first coupler layer and the second input coupler may be disposed in the second coupler layer.

The light guide structure may further include a third input coupler disposed adjacent to a side surface of the first input coupler in the first direction and configured to provide light to the first input coupler, and a fourth input coupler disposed adjacent to a side surface of the second input coupler in the first direction and configured to provide light to the side surface of the second input coupler.

The third input coupler and the fourth input coupler may be disposed in the first coupler layer.

The third input coupler may be disposed in the first coupler layer and the fourth input coupler may be disposed in the second coupler layer.

The light source may include a first light source configured to emit light to the first input coupler or the third input coupler, and a second light source configured to emit light to the second input coupler or the fourth input coupler.

A difference between a center wavelength of the light emitted from the first light source and a center wavelength of the light emitted from the second light source may be greater than 0 nm and less than or equal to 10 nm.

The light guide structure may further include a first substrate disposed above the first coupler layer, a second substrate disposed under the first coupler layer, a third substrate disposed above the second coupler layer and under the second substrate, and a fourth substrate disposed under the second coupler layer.

The light guide structure may further include a semi-transmissive layer disposed between the second substrate and the third substrate and configured to reflect a portion of incident light and transmit a remaining portion of the incident light.

The light guide structure may further include a reflection plate disposed at a lower surface of the fourth substrate.

A sum of a thickness of the first substrate and a thickness of the second substrate may be different from a sum of a thickness of the third substrate and a thickness of the fourth substrate.

The first substrate may have a thickness of about 15 nm or less and include SiO2.

The first output coupler and the first expansion coupler may respectively have a grating structure in which a plurality of recesses and a plurality of protrusions are periodically disposed, and the light guide structure further includes a polymer filling the plurality of recesses of the grating structure.

The light guide structure may include a first substrate disposed above the first coupler layer, a second substrate disposed under the first coupler layer and above the second coupler layer, and a third substrate disposed under the second coupler layer.

A sum of a thickness of the first substrate and a thickness of the second substrate may be different from a thickness of the third substrate.

The light source may include a first wavelength light source configured to emit light of a first wavelength, a second wavelength light source configured to emit light of a second wavelength that is different from the first wavelength, and a third wavelength light source configured to emit light of a third wavelength that is different from the first wavelength and the second wavelength, respectively.

The light guide structure may include a first light guide structure configured to guide the light of a first wavelength emitted from the first wavelength light source, a second light guide structure configured to guide the light of a second wavelength emitted from the second wavelength light source, and a third light guide structure configured to guide the light of a third wavelength emitted from the third wavelength light source.

According to another aspect of an example embodiment, there is provided a holographic display apparatus including a backlight unit configured to provide collimated illumination light, and a spatial light modulator configured to generate a holographic image by modulating the collimated illumination light received from the backlight unit, wherein the backlight unit includes a light source configured to emit light, and a light guide structure configured to guide the light emitted from the light source, wherein the light guide structure includes a first coupler layer and a second coupler layer facing the first coupler layer, wherein the first coupler layer includes a first output coupler configured to expand light traveling inside the light guide structure in a first direction and output the expanded light in the first direction to the outside of the light guide structure, and a first expansion coupler configured to expand the light traveling inside the light guide structure in a second direction perpendicular to the first direction and provide the expanded light in the second direction to the first output coupler, and wherein the second coupler layer includes a second output coupler configured to expand light traveling inside the light guide structure in the first direction and output the expanded light to the outside of the light guide structure, and a second expansion coupler configured to expand light traveling inside the light guide structure in the second direction and provide the expanded light to the second output coupler.

According to another aspect of an example embodiment, there is provided a backlight unit including a light source configured to emit light, and a light guide structure configured to guide the light emitted from the light source, wherein the light source includes a first light source configured to emit a first light and provided on a first edge of an upper surface of the light guide structure, and a second light source configured to emit a second light and provided on a second edge of the upper surface of the light guide structure, wherein the light guide structure includes a first grating layer comprising a first output grating configured to expand the first light traveling inside the light guide structure in a first direction and output the expanded first light in the first direction to the outside of the light guide structure, and a first expansion grating configured to expand the first light traveling inside the light guide structure in a second direction perpendicular to the first direction and provide the expanded first light in the second direction to the first output grating, and a second grating layer comprising a second output grating configured to expand the second light traveling inside the light guide structure in the first direction and output the expanded second light in the first direction to the outside of the light guide structure, and a second expansion grating configured to expand the second light traveling inside the light guide structure in the second direction and provide the expanded second light in the second direction to the second output grating, the second grating layer being provided on a lower surface of the first grating layer.

The light guide structure may further include a first substrate disposed above the first grating layer, a second substrate disposed under the first grating layer, a third substrate disposed above the second grating layer and under the second substrate, and a fourth substrate disposed under the second grating layer.

A sum of a thickness of the first substrate and a thickness of the second substrate may be different from a sum of a thickness of the third substrate and a thickness of the fourth substrate.

BRIEF DESCRIPTION OF THE DRAWINGS

The above and/or other aspects, features, and advantages of example embodiments will be more apparent from the following description taken in conjunction with the accompanying drawings, in which.

DETAILED DESCRIPTION OF THE DISCLOSURE

Figure 1:
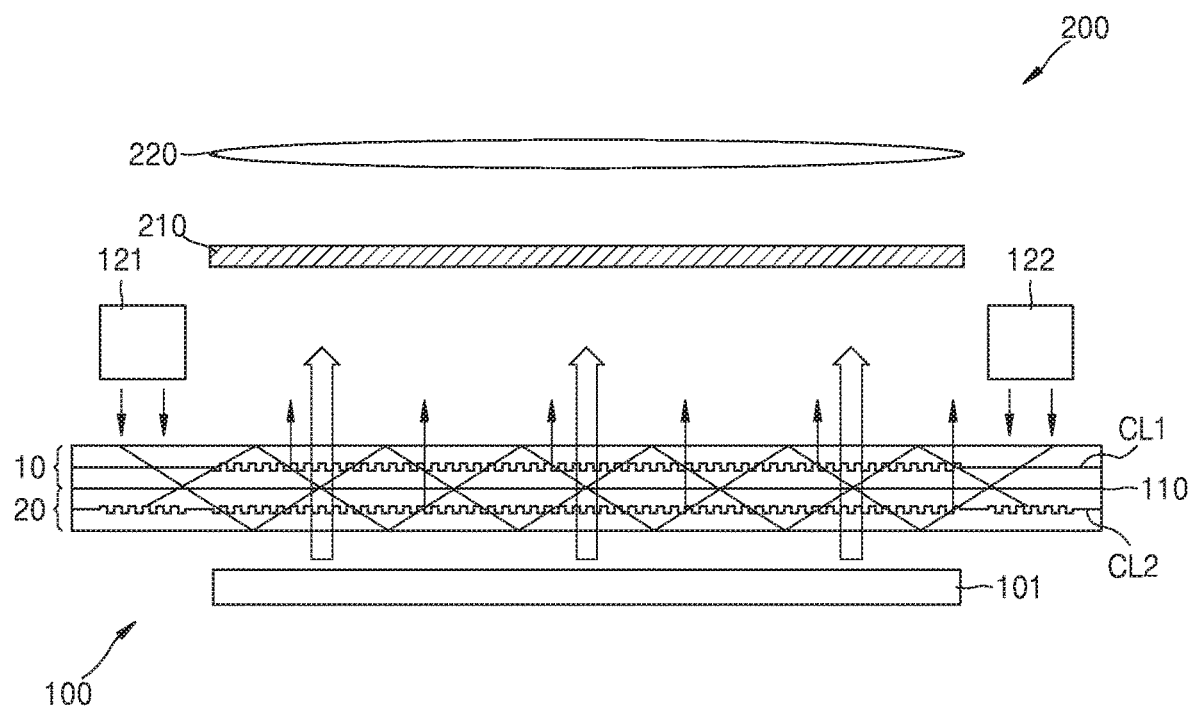
FIG. 1 is a schematic cross-sectional view of a holographic display apparatus according to an example embodiment.

Reference will now be made in detail to example embodiments of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, a backlight unit and a holographic display apparatus including the backlight unit will be described in detail with reference to the accompanying drawings. Also, the size of each layer illustrated in the drawings may be exaggerated for convenience of explanation and clarity. Furthermore, the example embodiments are merely described below, by referring to the figures, to explain aspects of the present disclosure, and the example embodiments may have different forms. In the layer structure described below, when a constituent element is disposed "above" or "on" to another constituent element, the constituent element may include not only an element directly contacting on the upper/lower/left/right sides of the other constituent element, but also an element disposed above/under/left/right the other constituent element in a non-contact manner.

FIG. 1 is a schematic cross-sectional view of a holographic display apparatus 200 according to an example embodiment. Referring to FIG. 1, the holographic display apparatus 200 may include a backlight unit 100 may provide collimated coherent illumination light, a spatial light modulator 210 may reproduce a holographic image by modulating the illumination light, and a Fourier lens 220 may focus the holographic image in a space. Although FIG. 1 illustrates that the spatial light modulator 210 is disposed between the Fourier lens 220 and the backlight unit 100, embodiments are not limited thereto. For example, the Fourier lens 220 may be disposed between the spatial light modulator 210 and the backlight unit 100.

The spatial light modulator 210 may form a holographic pattern to diffract and modulate illumination light, according to a hologram data signal, for example, a computer generated hologram (CGH) data signal, provided by an image processor. To this end, the spatial light modulator 210 may include a plurality of display pixels that are two-dimensionally (2D) arranged. Furthermore, any of a phase modulator for performing phase modulation only, an amplitude modulator for performing amplitude modulation only, and a composite modulator for performing both of the phase modulation and the amplitude modulation may be used as the spatial light modulator 210. Although FIG. 1 illustrates that the spatial light modulator 210 is a transmissive spatial light modulator, a reflective spatial light modulator may be used therefor. For a transmissive type spatial light modulator, a semiconductor modulator based on a compound semiconductor, for example, gallium arsenide (GaAs), or a liquid crystal modulator may be used as the spatial light modulator 210. For a reflective type spatial light modulator, for example, a digital micromirror device (DMD), a liquid crystal on silicon (LCoS), or a semiconductor modulator may be used as the spatial light modulator 210.

The backlight unit 100 may provide collimated coherent illumination light to the spatial light modulator 210. The backlight unit 100 may include light sources 121 and 122 that may emit coherent light and a light guide structure 110 to expand and collimate a section of the light emitted from the light sources 121 and 122 to correspond to the size of the spatial light modulator 210.

The light sources 121 and 122 may provide light traveling in opposite directions in the light guide structure 110. To this end, the light sources 121 and 122 may include a first light source 121 disposed above one side edge of the upper surface of the light guide structure 110 and a second light source 122 disposed at the opposite side edge of the upper surface of the light guide structure 110. The light emitted from the first light source 121 and the light emitted from the second light source 122 may travel in opposite directions in the light guide structure 110. To provide light having a relatively high coherence, the first light source 121 and the second light source 122 may include, for example, a laser diode. In addition to the laser diode, any light source capable of emitting light having spatial coherence may be employed therefor. Although FIG. 1 illustrates, for convenience of explanation, that each of the first light source 121 and the second light source 122 is provided as a singular light source, each of the first light source 121 and the second light source 122 may include an array of a plurality of light sources.

Furthermore, the holographic display apparatus 200 may further include a 2D backlight unit 101 for providing illumination light for a 2D image. The illumination light for a 2D image provided by the 2D backlight unit 101 may not have coherence nor be necessarily collimated. The 2D backlight unit 101 may include, for example, a light-emitting diode (LED), as the light source, and may provide the spatial light modulator 210 with the light emitted from an LED light source by expanding the light with a light guide plate. While the holographic display apparatus 200 reproduces a holographic image, the backlight unit 100 may be turned on and the 2D backlight unit 101 may be turned off, and while the holographic display apparatus 200 reproduces a general 2D image, the backlight unit 100 may be turned off and the 2D backlight unit 101 may be turned on.

The holographic display apparatus 200 may further include the image processor that may generate a hologram data signal according to a holographic image to be provided to a viewer and provide the generated hologram data signal to the spatial light modulator 210, and may control the operations of the backlight unit 100 and the 2D backlight unit 101. Furthermore, the holographic display apparatus 200 may further include an eye tracker that may track the position of a viewer's pupil in real time and a beam deflector that may adjust the position of the holographic image focused by the Fourier lens 220 based on the position of the viewer's pupil provided by the eye tracker.

According to the example embodiment, the light guide structure 110 may form illumination light by uniformly collimating the light emitted from the first light source 121 and the second light source 122. To this end, the light guide structure 110 may include at least two light guide layers stacked in a thickness direction and at least two coupler layers respectively disposed to face each other in the different light guide layers. For example, in FIG. 1, the light guide structure 110 is illustrated to include a first light guide layer 10 where a first coupler layer CL1 is disposed and a second light guide layer 20 where a second coupler layer CL2 is disposed. In the above structure, the light emitted from the first light source 121 may be coupled by the first coupler layer CL1, and the light emitted from the second light source 122 may be coupled by the second coupler layer CL2. Each of the first coupler layer CL1 and the second coupler layer CL2 may include a plurality of couplers that may guide incident light to the inside of the light guide structure 110, expand the light traveling along the inside of the light guide structure 110 in two directions perpendicular to each other, and output the light to the outside of the light guide structure 110.

Figure 2:
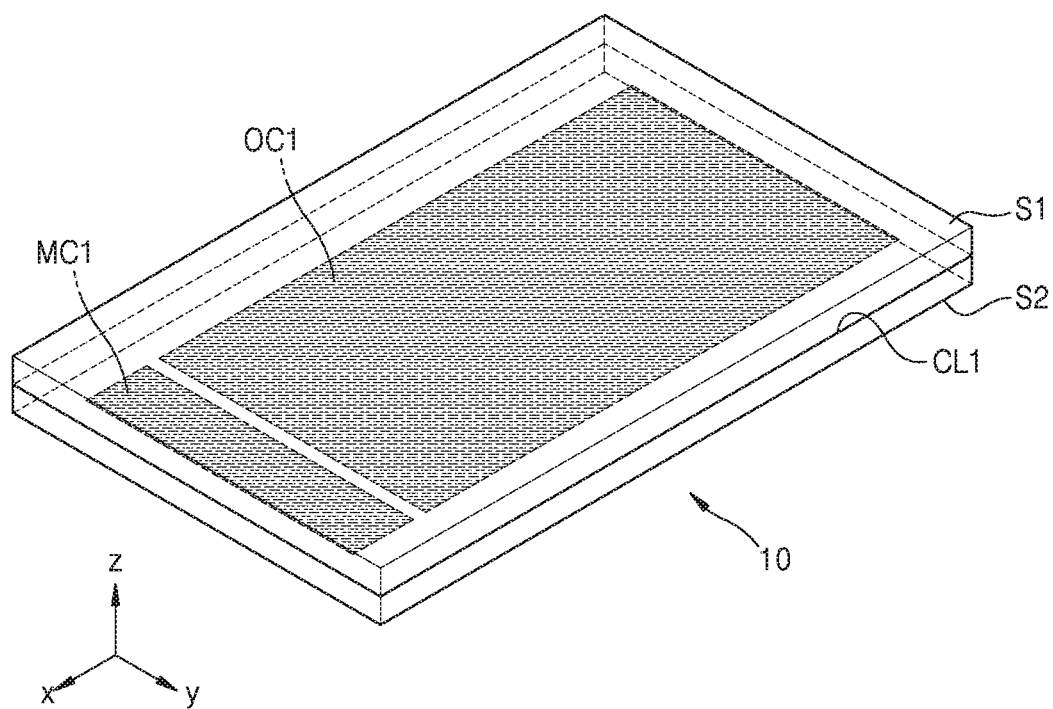
FIG. 2 is a schematic perspective view of a configuration of a first light guide layer of a backlight unit according to an example embodiment.
Figure 3:
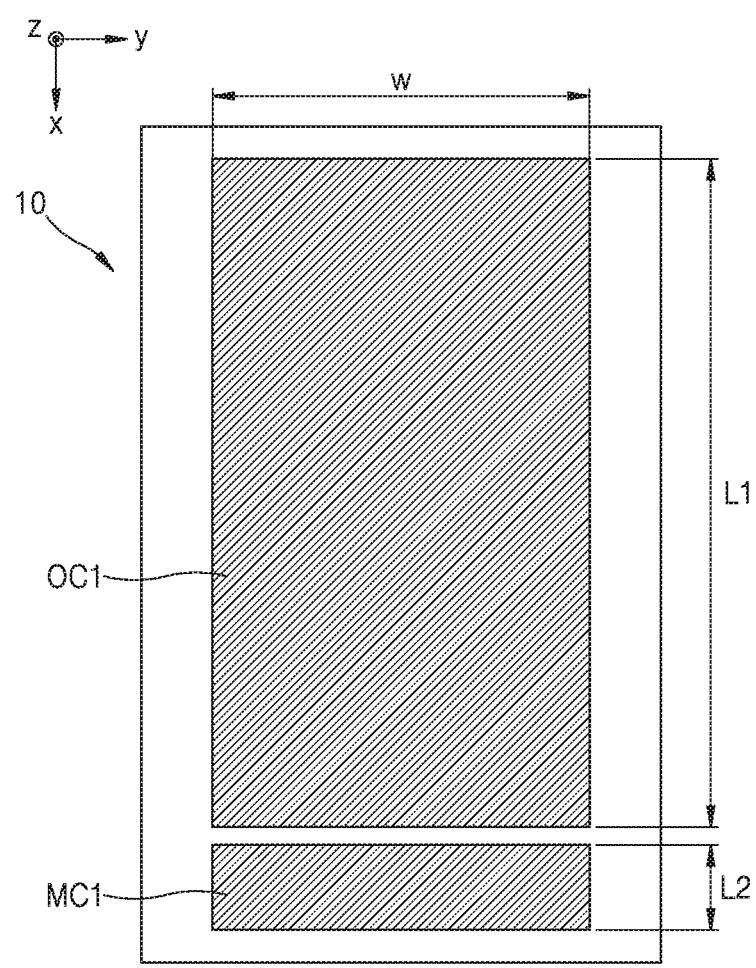
FIG. 3 is a schematic plan view of a configuration of the first light guide layer of FIG. 2.

For example, FIG. 2 is a schematic perspective view of a configuration of the first light guide layer 10 of the backlight unit 100 according to an example embodiment. FIG. 3 is a schematic plan view of a configuration of the first light guide layer 10 of FIG. 2. Referring to FIGS. 2 and 3, the first light guide layer 10 may include a first substrate S1 and a second substrate S2, which are stacked in the thickness direction, that is, a +z-axis direction, and the first coupler layer CL1 is disposed between the first substrate S1 and the second substrate S2. The first substrate S1 and the second substrate S2 may include a material such as glass or a polymer that is transmissive to light including an infrared light, a visible light, or an ultraviolet light. Furthermore, the first coupler layer CL1 may include a first output coupler OC1 and a first expansion coupler MC1, which are disposed adjacent to each other.

The first output coupler OC1 expands the light traveling along the inside of the light guide structure 110 in an x-axis direction. Furthermore, the first output coupler OC1 may output the light traveling along the inside of the light guide structure 110 to provide illumination light to the spatial light modulator 210. To this end, the first output coupler OC1 may be disposed to face the spatial light modulator 210 of the holographic display apparatus 200, and a y-axis directional width W and an x-axis directional length L1 of the first output coupler OC1 may be similar to the width and length of the spatial light modulator 210.

The first expansion coupler MC1 is disposed at one side surface of the first output coupler OC1 in the x-axis direction. The first expansion coupler MC1 may expand the light traveling along the inside of the light guide structure 110 in the +y-axis direction and provide the expanded light to the first output coupler OC1. To this end, as illustrated in FIG. 3, the y-axis directional width W of the first expansion coupler MC1 may be the same as the y-axis directional width W of the first output coupler OC1. An x-axis directional length L2 of the first expansion coupler MC1 may be less than the x-axis directional length L1 of the first output coupler OC1.

Figure 4:
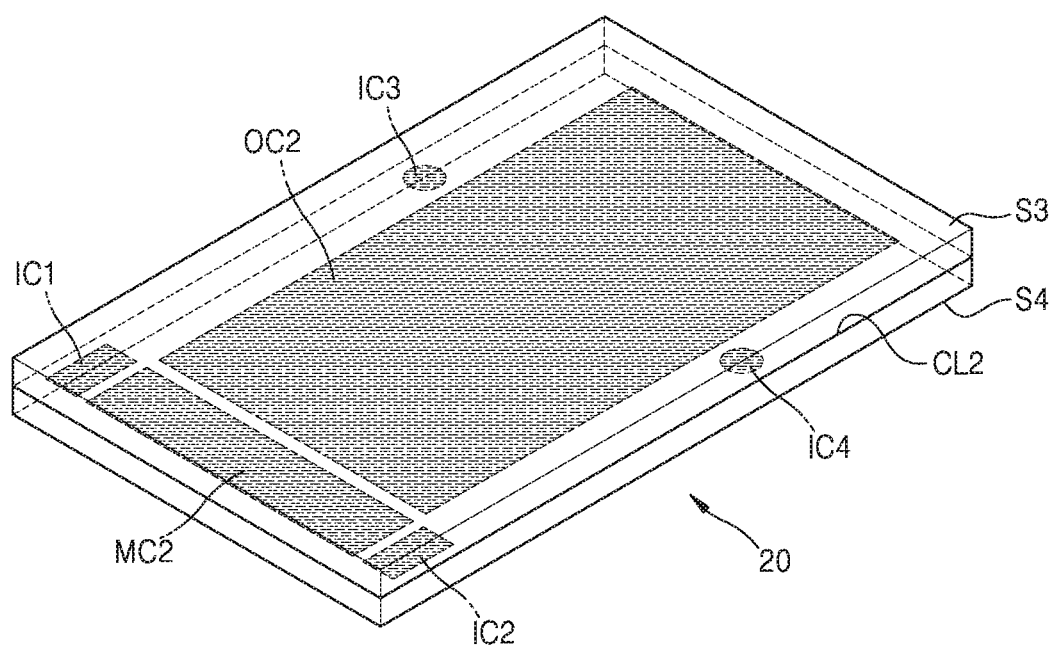
FIG. 4 is a schematic perspective view of a configuration of a second light guide layer of a backlight unit according to an example embodiment.
Figure 5:
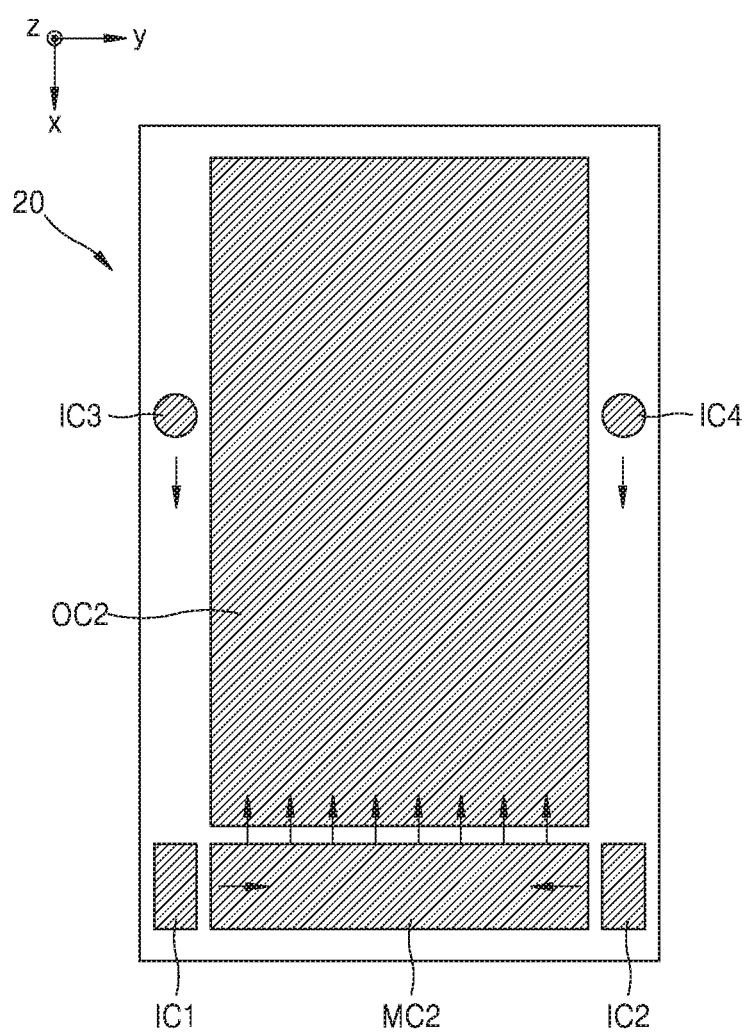
FIG. 5 is a schematic plan view of a configuration of the second light guide layer of FIG. 4.

Furthermore, FIG. 4 is a schematic perspective view of a configuration of the second light guide layer 20 of the backlight unit 100 according to an example embodiment. FIG. 5 is a schematic plan view of a configuration of the second light guide layer 20 of FIG. 4. Referring to FIGS. 4 and 5, the second light guide layer 20 may include a third substrate S3 and a fourth substrate S4, which are stacked in the thickness direction, that is, the z-axis direction, and the second coupler layer CL2 disposed between the third substrate S3 and the fourth substrate S4. The third substrate S3 and the fourth substrate S4 may include a material such as glass or a polymer that is transmissive to light including an infrared light, a visible light, or an ultraviolet light. Furthermore, the second coupler layer CL2 may include a second output coupler OC2, a second expansion coupler MC2 disposed adjacent to the second output coupler OC2 in the x-axis direction, a first input coupler IC1 and a second input coupler IC2 disposed at opposite sides of the second expansion coupler MC2 in the y-axis direction, a third input coupler IC3 disposed to face the first input coupler IC1 in the x-axis direction, and a fourth input coupler IC4 disposed to face the second input coupler IC2 in the x-axis direction.

The second output coupler OC2 may expand the light traveling along the inside of the light guide structure 110 in the x-axis direction. Furthermore, the second output coupler OC2 may output the light traveling along the inside of the light guide structure 110 to provide illumination light to the spatial light modulator 210. The first output coupler OC1 and the second output coupler OC2 are disposed to face each other in the z-axis direction and may have the same size.

The second expansion coupler MC2 is disposed at one side surface of the second output coupler OC2 in the x-axis direction. The second expansion coupler MC2 may expand the light traveling along the inside of the light guide structure 110 in the y-axis direction and provide the expanded light to the second output coupler OC2. To this end, the y-axis direction width of the second expansion coupler MC2 may be the same as the y-axis direction width of the second output coupler OC2, and the x-axis direction length of the second expansion coupler MC2 may be less than the x-axis direction length of the second output coupler OC2. The first expansion coupler MC1 and the second expansion coupler MC2 may be disposed to face each other in the z-axis direction and may have the same size.

The third input coupler IC3 is disposed to face the first light source 121 in the z-axis direction and may guide the light emitted from the first light source 121 to the inside of the light guide structure 110. The light guided by the third input coupler IC3 to the inside of the light guide structure 110 may travel in the +x-axis direction and be incident on the first input coupler IC1. The first input coupler IC1 may slightly expand the incident light in the x-axis direction and change a traveling direction of the incident light in the +y-axis direction. The light having a direction changed by the first input coupler IC1 may travel in the light guide structure 110 in the +y-axis direction and be provided to the first expansion coupler MC1 and the second expansion coupler MC2.

Furthermore, the fourth input coupler IC4 is disposed to face the second light source 122 in the z-axis direction and may guide the light emitted from the second light source 122 to the inside of the light guide structure 110. The light guided by the fourth input coupler IC4 to the inside of the light guide structure 110 may travel in the +x-axis direction and be incident on the second input coupler IC2. The second input coupler IC2 may slightly expand the incident light in the x-axis direction and changes a traveling direction of the incident light in the −y-axis direction. Then, the light having a direction changed by the second input coupler IC2 may travel in the light guide structure 110 in the −y-axis direction and be supplied to the first expansion coupler MC1 and the second expansion coupler MC2. Accordingly, the light emitted from the first light source 121 may travel in the +y-axis direction and be provided to the first expansion coupler MC1 and the second expansion coupler MC2, and the light emitted from the second light source 122 may travel in the −y-axis direction opposite to the traveling direction of the light emitted from the first light source 121 and be provided to the first expansion coupler MC1 and the second expansion coupler MC2.

The above-described first output coupler OC1, second output coupler OC2, first expansion coupler MC1, second expansion coupler MC2, and first to fourth input couplers IC1, IC2, IC3, and IC4 may be formed in a variety of types of surface gratings or volume gratings. A surface grating, which is a grating directly formed on a surface of a substrate, may include a diffractive optical element (DOE), for example, a binary phase grating or a blazed grating. A plurality of grating patterns of the DOE may serve as diffractive gratings and diffract the incident light. For example, the surface grating may diffract light incident in a specific angle range according to the size, height, cycle, duty ratio, or shape of grating patterns, causing destructive interference and constructive interference, thereby changing a traveling direction of the light. A volume grating may be formed separated from the substrate, and may include, for example, a holographic optical element (HOE), a geometric phase grating, a Bragg polarization grating, or a holographically formed polymer dispersed liquid crystal (H-PDLC). The volume grating may include cyclic fine patterns of materials having different refractive indexes. In particular, the third input coupler IC3 and the fourth input coupler IC4 may use gratings having a relatively high directivity and efficiency, for example, a blazed grating or a volume grating, such that the incident light is transmitted to the first input coupler IC1 and the second input coupler IC2 without loss.

The third input coupler IC3 and the fourth input coupler IC4 may be omitted. In this case, the first input coupler IC1 may guide the light emitted from the first light source 121 to the inside of the light guide structure 110 and the second input coupler IC2 may guide the light emitted from the second light source 122 to the inside of the light guide structure 110. To this end, the first light source 121 may be disposed to face the first input coupler IC1, and the second light source 122 may be disposed to face the second input coupler IC2.

Figure 6:
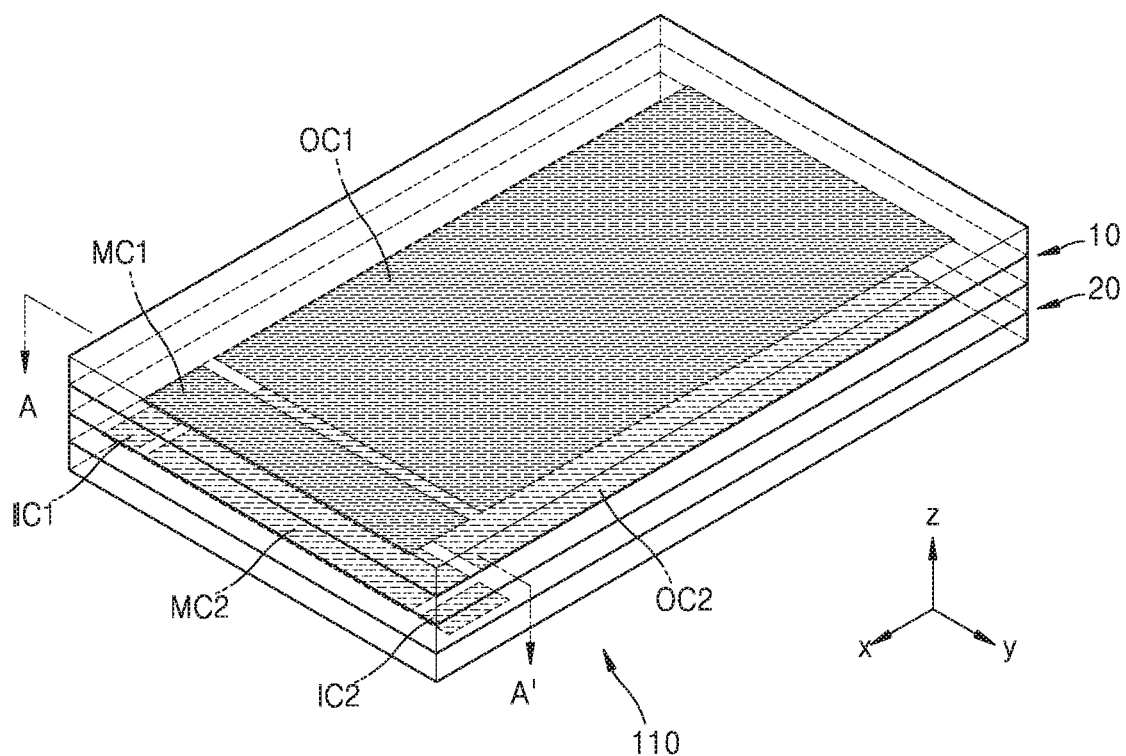
FIG. 6 is a schematic perspective view of a configuration of an entire light guide structure by assembling the first light guide layer of FIG. 2 and the second light guide layer of FIG. 4.

FIG. 6 is a schematic perspective view of a configuration of a light guide structure 110 according to an example embodiment, in which the first light guide layer 10 of FIGS. 2 and 3 and the second light guide layer 20 of FIGS. 4 and 5 are bonded to each other. Referring to FIG. 6, the light guide structure 110 has a structure in which the first light guide layer 10 is stacked on the second light guide layer 20. Then, the first output coupler OC1 in the first light guide layer 10 is disposed to face the second output coupler OC2 in the second light guide layer 20, and the first expansion coupler MC1 in the first light guide layer 10 is disposed to face the second expansion coupler MC2 in the second light guide layer 20.

Figure 7:
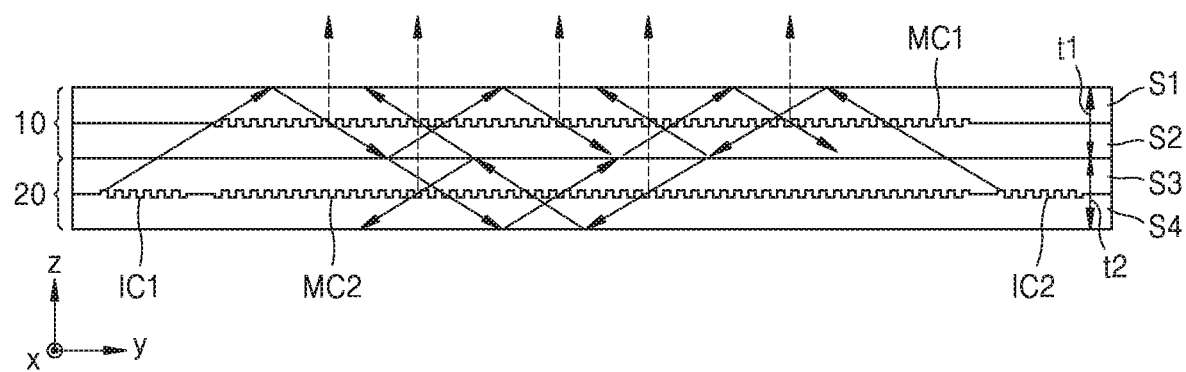
FIG. 7 is a schematic cross-sectional view taken along line A-A' in the light guide structure illustrated in FIG. 6, showing a light traveling and coupling operation.

FIG. 7 is a schematic cross-sectional view taken along line A-A' in the light guide structure 110 of FIG. 6, showing a light traveling and coupling operation. FIG. 7 is a schematic cross-sectional view showing a light traveling and coupling operation in the light guide structure 110 including the first expansion coupler MC1 and the second expansion coupler MC2. Referring to FIG. 7, the light guide structure 110 may include the fourth substrate S4, the third substrate S3 stacked on the fourth substrate S4, the second substrate S2 stacked on the third substrate S3, and the first substrate S1 stacked on the second substrate S2. The first expansion coupler MC1 is disposed between the first substrate S1 and the second substrate S2. In contrast, the second expansion coupler MC2, the first input coupler IC1, and the second input coupler IC2 are disposed between the third substrate S3 and the fourth substrate S4.

As described above, the light incident on the third input coupler IC3 from the first light source 121 travels along the inside of the light guide structure 110 and is incident on the first input coupler IC1. The traveling direction of the light is changed by about 90° by the first input coupler IC1 and travels in the +y-axis direction along the inside of the light guide structure 110. As illustrated in FIG. 7, the light may travel in the +y-axis direction in the light guide structure 110 by being totally reflected from an upper surface of the first substrate S1 and a lower surface of the fourth substrate S4 of the light guide structure 110.

Furthermore, the light incident on the fourth input coupler IC4 from the second light source 122 travels along the inside of the light guide structure 110 and is incident on the second input coupler IC2. The traveling direction of the light is changed by about 90° by the second input coupler IC2 and travels in the −y-axis direction along the inside of the light guide structure 110. As illustrated in FIG. 7, the light may travel in the −y-axis direction the inside of the light guide structure 110 by being totally reflected from the upper surface of the first substrate S1 and the lower surface of the fourth substrate S4 of the light guide structure 110. Accordingly, the light emitted from the first light source 121 and the light emitted from the second light source 122 travel in the opposite directions in the light guide structure 110 including the first expansion coupler MC1 and the second expansion coupler MC2.

While traveling inside the light guide structure 110, the light is repeatedly incident on the first expansion coupler MC1 and the second expansion coupler MC2. The first expansion coupler MC1 and the second expansion coupler MC2 may perform coupling only on the light incident in a specific direction. In other words, the first expansion coupler MC1 may couple part of the light incident at a first angle to be transmitted to the first output coupler OC1 and the second output coupler OC2 and may transmit light incident at angles other than the first angle. Furthermore, the second expansion coupler MC2 may couple part of the light incident at a second angle different from the first angle to be transmitted to the first output coupler OC1 and second output coupler OC2 and may transmit light incident at angles other than the second angle. In this state, the first angle and the second angle may have the same size but opposite signs with respect to a surface normal of the light guide structure 110.

For example, referring to FIG. 7, the first expansion coupler MC1 may couple part of the light traveling in the +y-axis direction obliquely downward from the first substrate S1 to the fourth substrate S4. Accordingly, the first expansion coupler MC1 may couple only the light emitted from the first light source 121. Although FIG. 7 illustrates, for convenience of explanation, that the light coupled by the first expansion coupler MC1 exits the light guide structure 110 in a perpendicular direction, the light does not exit the light guide structure 110, but travels in the light guide structure 110 in the −x-axis direction.

Furthermore, the second expansion coupler MC2 may couple part of the light input in the −y-axis direction obliquely downward from the first substrate S1 to the fourth substrate S4. Accordingly, the second expansion coupler MC2 may couple only the light emitted from the second light source 122. Although FIG. 7 illustrates, for convenience of explanation, that the light coupled by the second expansion coupler MC2 exits the light guide structure 110 in a perpendicular direction, the light does not exit the light guide structure 110, but travels in the light guide structure 110 in the −x-axis direction. As a result, the light may be expanded in the y-axis direction by the first expansion coupler MC1 and the second expansion coupler MC2 to be provided to the first output coupler OC1 and the second output coupler OC2.

The light coupled by the first expansion coupler MC1 and second expansion coupler MC2 in the above method travels in the light guide structure 110 in the −x-axis direction. While traveling in the −x-axis direction, as described in FIG. 7, the light is totally reflected from the upper surface of the first substrate S1 and the lower surface of the fourth substrate S4 of the light guide structure 110 to be repeatedly incident on the first output coupler OC1 and the second output coupler OC2. Part of the light incident on the first output coupler OC1 and the second output coupler OC2 is coupled by the first output coupler OC1 and the second output coupler OC2 and output in the +z-axis direction through the upper surface of the first substrate S1 of the light guide structure 110. In the process, the light may be expanded by the first output coupler OC1 and the second output coupler OC2 in the x-axis direction. Then, the light output from the light guide structure 110 may be incident on the spatial light modulator 210 as collimated illumination light.

Figure 8:
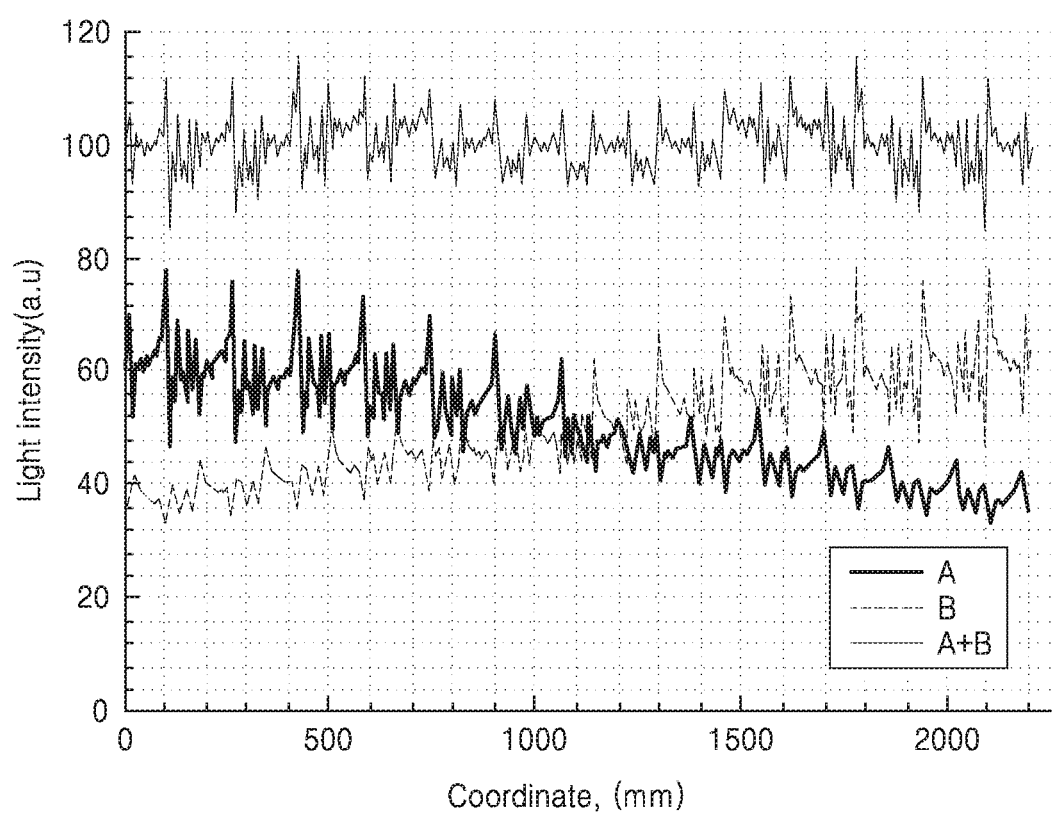
FIG. 8 is a graph of individual output intensity and overall output intensity of light traveling in opposite directions in the light guide structure illustrated in FIG. 7.

FIG. 8 is a graph of individual output intensity and overall output intensity of the light traveling in opposite directions in the light guide structure 110 of FIG. 7. In FIG. 8, a graph A shows a relationship between the intensity of light emitted from the first light source 121 and coupled by the first expansion coupler MC1 and a coupling position of the first expansion coupler MC1, and a graph B shows a relationship between the intensity of the light emitted from the second light source 122 and coupled by the second expansion coupler MC2 and a coupling position of the second expansion coupler MC2. As illustrated in FIG. 8, the intensity of the light coupled by the first expansion coupler MC1 gradually increases in the +y-axis direction, and the intensity of the light coupled by the second expansion coupler MC2 gradually increases in the −y-axis direction. As a result, the sum (A+B) of the intensity of the light coupled by the intensity of the light coupled by the first expansion coupler MC1 and the second expansion coupler MC2 is maintained at a relatively uniform level. Accordingly, an intensity distribution of the light finally output from the light guide structure 110 by the first output coupler OC1 and the second output coupler OC2 may be maintained to be uniform.

Referring back to FIG. 7, to further maintain the uniformity of the sum of the intensity of the light coupled by the first expansion coupler MC1 and the second expansion coupler MC2, a thickness t1 of the first light guide layer 10 and a thickness t2 of the second light guide layer 20 of the light guide structure 110 may be selected to be different from each other. In other words, the thickness t1 that is the sum of the thickness of the first substrate S1 and the thickness of the second substrate S2 may be different from the thickness t2 that is the sum of the thickness of the third substrate S3 and the thickness of the fourth substrate S4. Then, compared to a case in which the thickness t1 of the first light guide layer 10 and the thickness t2 of the second light guide layer 20 are the same, regularity of positions where the light traveling in the +y-axis direction is incident on the first expansion coupler MC1 and regularity of positions where the light traveling in the −y-axis direction is incident on the second expansion coupler MC2 may be reduced, and thus the light may be more irregularly or uniformly distributed.

Figure 9:
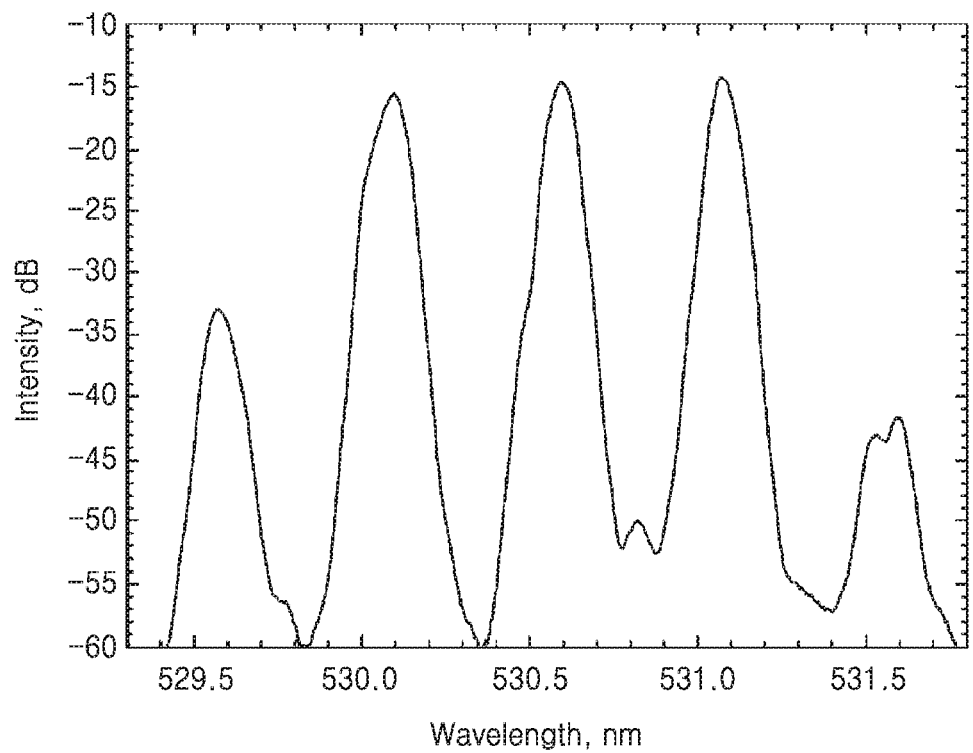
FIG. 9 is a graph of a wavelength distribution of light emitted from one light source.

When the first light source 121 and the second light source 122 use laser diodes that emit light having a single wavelength, speckle noise may occur in illumination light due to interference of laser beams. Accordingly, to reduce the speckle noise, the first light source 121 and the second light source 122 may use laser diodes that emit light having a multi-peak wavelength distribution. For example, FIG. 9 is a graph of a wavelength distribution of light emitted from one light source. As illustrated in FIG. 9, the speckle noise may be reduced when the light emitted from the first light source 121 and the second light source 122 has a multi-peak wavelength distribution in a narrow wavelength range of about 20 nm or less. Furthermore, a center wavelength of the first light source 121 and a center wavelength of the second light source 122 may be slightly different from each other. For example, a difference between the center wavelength of the light emitted from the first light source 121 and the center wavelength of the light emitted from the second light source 122 may be greater than 0 nm and equal to or less than 10 nm. Then, the occurrence of speckle noise in the illumination light provided by the spatial light modulator 210 may be further reduced.

As described above, the backlight unit 100 according to the example embodiment may provide uniform illumination light because one illumination light is generated by coupling the light traveling in the opposite directions. Accordingly, a strip pattern in the illumination light, which is formed as a bright pattern and a dark pattern are repeatedly distributed when only one light traveling in one direction in the light guide structure 110 is coupled, may be reduced or restricted. Furthermore, as the backlight unit 100 according to the example embodiment provides the illumination light in which speckle noise hardly exists, the quality of a holographic image produced by the holographic display apparatus 200 that includes the backlight unit 100 according to the example embodiment may be improved.

Furthermore, the backlight unit 100 according to the example embodiment may provide collimated coherent illumination light uniformly to a relatively large area, by using the light guide structure 110, and may be manufactured to be relatively thin. Accordingly, the holographic display apparatus 200 including the backlight unit 100 according to the example embodiment may be manufactured to be relatively thin. The holographic display apparatus 200 may be applied to various fields such as three-dimensional (3D) mobile devices, 3D tablets, or 3D televisions (TVs).

Figure 10:
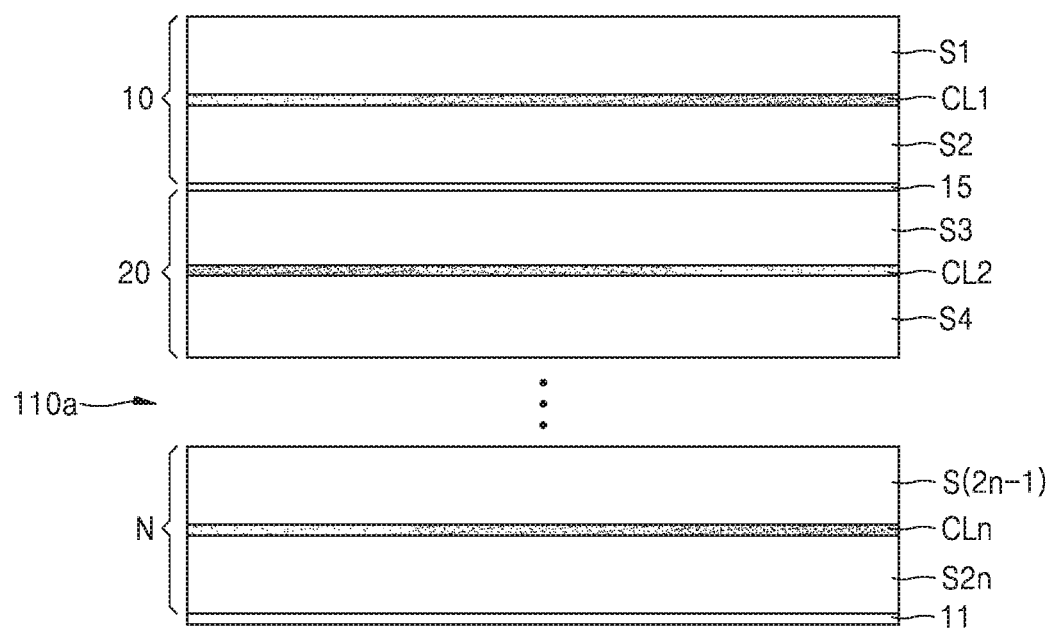
FIG. 10 is a schematic cross-sectional view of a configuration of a light guide structure of a backlight unit according to another example embodiment.

The light guide structure 110 is described above to have two light guide layers, that is, the first light guide layer 10 and the second light guide layer 20. However, embodiments are not limited thereto, and the light guide structure 110 may include two or more light guide layers. For example, FIG. 10 is a schematic cross-sectional view of a configuration of a light guide structure 110a of the backlight unit 100 according to another example embodiment. Referring to FIG. 10, the light guide structure 110a may include an n-number of light guide layers 10, 20, . . . , N. Here, n is a natural number greater than 2. The first light guide layer 10 may include a first substrate S1, a first coupler layer CL1, and a second substrate S2, and the second light guide layer 20 may include a third substrate S3, a second coupler layer CL2, and a fourth substrate S4. An n-th light guide layer N may include a (2n−1)th substrate S(2n−1), an n-th coupler layer CLn, and a 2n-th substrate S2n. The layers from the n-th light guide layer N to the first light guide layer 10 may be sequentially stacked. The first to 2n-th substrates S1, S2, . . . , S2n−1, and S2n may be include a material such as glass or a polymer that is transmissive to light including an infrared light, a visible light, or an ultraviolet light.

Accordingly, the light guide structure 110a may include an n-number of coupler layers CL1, CL2, . . . , CLn. One output coupler and one expansion coupler may be disposed in each of the first to n-th coupler layers CL1, CL2, . . . , CLn. Accordingly, the light guide structure 110a may include an n-number of output couplers and an n-number of expansion couplers. The n-number of output couplers are disposed to face each other in the first to n-th coupler layers CL1, CL2, . . . , CLn different from each other, and the n-number of expansion couplers are disposed to face each other in the first to n-th coupler layers CL1, CL2, . . . , CLn different from each other. In the first to fourth input couplers IC1, IC2, IC3, and IC4, only one coupler layer among the first to n-th coupler layers CL1, CL2, . . . , CLn may be disposed.

The light traveling inside the light guide structure 110a may be totally reflected from the upper surface of the first substrate S1 and a lower surface of the 2n-th substrate S2n. While traveling inside the light guide structure 110, the light may be coupled by the n-number of expansion couplers and then output-coupled by the n-number of output couplers to the outside of the light guide structure 110a. To maintain the intensity distribution of the output-coupled light uniform, the thicknesses of the first to n-th light guide layers 10, 20, . . . , N may be different from each other.

Furthermore, to bond the first to n-th light guide layers 10, 20, . . . , N to each other, a bonding layer 15 may be further disposed between two adjacent light guide layers among the first to n-th light guide layers 10, 20, . . . , N. For example, the bonding layer 15 may be further disposed between the second substrate S2 of the first light guide layer 10 and the third substrate S3 of the second light guide layer 20. To maintain the intensity distribution of the output-coupled light to be uniform, the bonding layer 15 may include a semi-transmissive layer that reflects part of the incident light and transmits the other part of the incident light. For example, the bonding layer 15 may reflect 10% to 90% of the incident light and transmit 90% to 10% thereof. Then, part of the light from the second substrate S2 that is incident on an interface between the second substrate S2 and the third substrate S3 may be reflected from the bonding layer 15 to travel back to the second substrate S2, and the other part of the light may be transmitted by the bonding layer 15 to continuously travel toward the third substrate S3. The bonding layer 15 may include, for example, a resin material having a refractive index that is different from a refractive index of the first to 2n-th substrates S1, S2, . . . , S2n−1, and S2n. Furthermore, the bonding layer 15 may include, instead of the resin material, dichroic coating that transmits part of the light incident at a preset specific angle and reflects the other part of light incident at an angle other than the preset specific angle. However, embodiment are not limited thereto. For example, the dichroic coating may transmit all light incident at an angle different from the preset specific angle.

Furthermore, a reflection plate 11 may be further disposed at the lowermost surface of the light guide structure 110a. For example, the reflection plate 11 may be disposed at a lower surface of the 2n substrate S2n. The reflection plate 11 may reflect light that is transmitted by the 2n substrate S2n to the outside, not being totally reflected from the lower surface of the 2n substrate S2n, to be obliquely reflected to the inside of the 2n substrate S2n, from among the light obliquely incident on the lower surface of the 2n substrate S2n. The light utilization efficiency of the backlight unit 100 may be improved by reducing loss of light by using the reflection plate 11.

Figure 11:
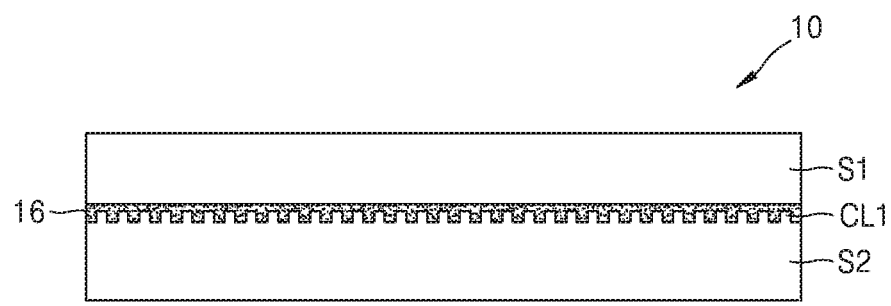
FIG. 11 is a schematic cross-sectional view of a configuration of a first light guide layer of a backlight unit according to another example embodiment.

FIG. 11 is a schematic cross-sectional view of a configuration of the first light guide layer 10 of the backlight unit 100 according to another example embodiment. The first to n-th coupler layers CL1, CL2, . . . , CLn of FIG. 10 may include, for example, volume gratings, and may be manufactured separated from the first to 2n-th substrates S1, S2, . . . , S2n−1, and S2n. The light guide structure 110a may be manufactured by bonding two substrates corresponding thereto with the separately manufactured first to n-th coupler layers CL1, CL2, . . . , CLn inserted therebetween. However, instead of the volume gratings of FIG. 10, as illustrated in FIG. 11, the first to n-th coupler layers CL1, CL2, ..., CLn may be formed directly on the surface of the substrate. For example, like a blazed grating or a binary phase grating, surface gratings having a plurality of cyclically fine grating patterns in which a plurality of recesses and a plurality of protrusions that are periodically arranged may be formed directly on the surface of the substrate by selectively using various processes such as imprinting or etching.

In FIG. 11, for example, the first coupler layer CL1 is formed on the upper surface of the second substrate S2. The first substrate S1 may have a flat lower surface. A polymer layer 16, as a planarization layer, may further fill a plurality of recesses in a periodic pattern of the first coupler layer CL1 formed on the upper surface of the second substrate S2. The polymer layer 16 may include the same material as the first substrate S1 or a material having the same refractive index as that of the first substrate S1. The polymer layer 16 may completely cover the first coupler layer CL1. However, embodiments are not limited thereto. For example, the second substrate S2 may have a flat upper surface, and the first coupler layer CL1 may be formed on the lower surface of the first substrate S1.

In the above-described example embodiments, one coupler layer is disposed between two substrates. The number of the first to 2n-th substrates S1, S2, ..., S2n-1, and S2n is twice the number of the first to n-th coupler layers CL1, CL2, ..., CLn. However, embodiments are not limited thereto. For example, the coupler layers may be disposed on both surfaces of one substrate. For example, FIG. 12 is a schematic cross-sectional view of a configuration of a light guide structure 110b of the backlight unit 100 according to another example embodiment.

Figure 12:
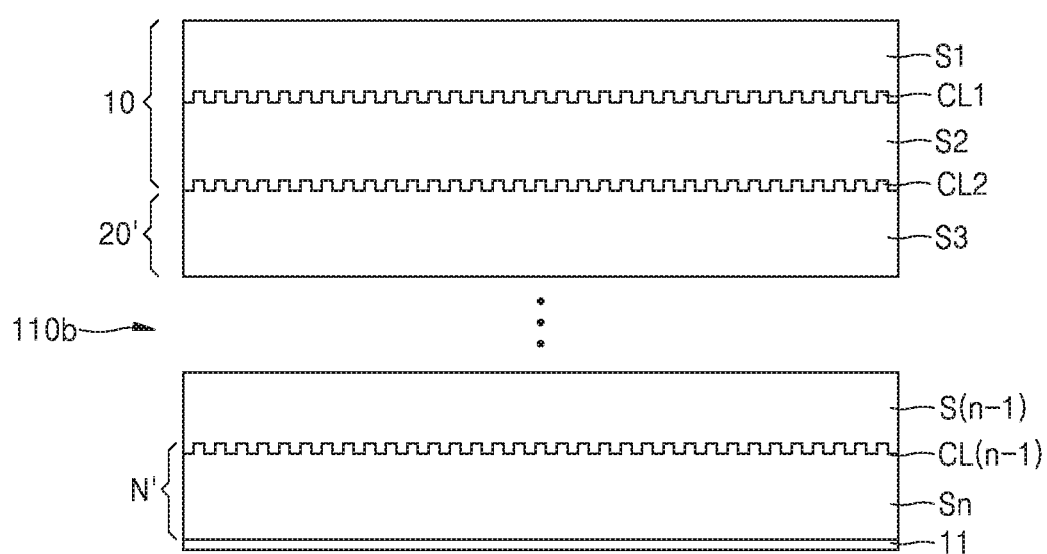
FIG. 12 is a schematic cross-sectional view of a configuration of a light guide structure of a backlight unit according to another example embodiment.

Referring to FIG. 12, the first coupler layer CL1 is disposed between the first substrate S1 and the second substrate S2, and the second coupler layer CL2 is disposed between the second substrate S2 and the third substrate S3. Furthermore, an (n−1)th coupler layer CLn−1 is disposed between an (n−1)th substrate Sn−1 and the n-th substrate Sn. Accordingly, although the configuration of the first light guide layer 10 is the same as that described above, the second light guide layer 20' may include the third substrate S3 and only the second coupler layer CL2 disposed on the upper surface of the third substrate S3, and an n-th light guide layer N' may include the n-th substrate Sn and only an (n−1)th coupler layer CLn−1 disposed on the upper surface of the n-th substrate Sn. In the light guide structure 110b of FIG. 12, the number of the first to n-th substrates S1, S2, Sn may be greater by one than the number of the first to (n−1)th coupler layers CL1, CL2, ..., CLn−1.

Furthermore, to improve the uniformity of illumination light, the sum of the thickness t1 of the first substrate S1 and the thickness t2 of the second substrate S2 may be different from the thickness of the third substrate S3. The thickness of the first light guide layer 10 may be different from the thickness of the second light guide layer 20' The thickness of the n-th light guide layer N' may be different from the thickness of the first light guide layer 10 or the thickness of the second light guide layer 20'.

As illustrated in FIG. 12, when the polymer layer 16 does not exist, a lower surface of a substrate disposed above may have a pattern shape complementary to the periodic patterns of the coupler layer disposed under the substrate disposed above the coupler layer. For example, the lower surface of the first substrate S1 may have a complementary pattern to the pattern of the first coupler layer CL1 disposed on the upper surface of the second substrate S2. Furthermore, the lower surface of the second substrate S2 may have a complementary pattern to the pattern of the second coupler layer CL2. In this connection, the coupler layers may be formed on both surfaces of the second to (n−1)th substrates S2, S3, ..., Sn−1.

However, as illustrated in FIG. 11, the polymer layer 16 may be further filled between the patterns of the first to (n−1)th coupler layers CL1, CL2, ..., CLn−1. In this case, the first to n-th substrates S1, S2, S3, ..., Sn may have flat lower surfaces, and the first to (n−1)th coupler layers CL1, CL2, ..., CLn−1 may be formed only on the upper surfaces of the second to n-th substrates S2, S3, Sn.

Figure 13:
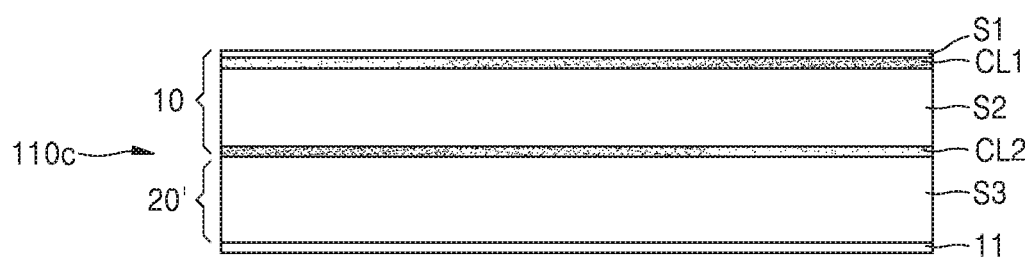
FIG. 13 is a schematic cross-sectional view of a configuration of a light guide structure of a backlight unit according to another example embodiment.

FIG. 13 is a schematic cross-sectional view of a configuration of a light guide structure 110c of the backlight unit 100 according to another example embodiment. Referring to FIG. 13, the first substrate S1 of the light guide structure 110c may have a thickness smaller than the thicknesses of the other substrates. For example, the first substrate S1 may have a thickness of about 15 nm or less, and substrates other than the first substrate S1 may each have a thickness of about 0.1 mm to about 2 mm. The first substrate S1 may include silicon oxide ($SiO_2$) to serve as a protective layer.

Figure 14:
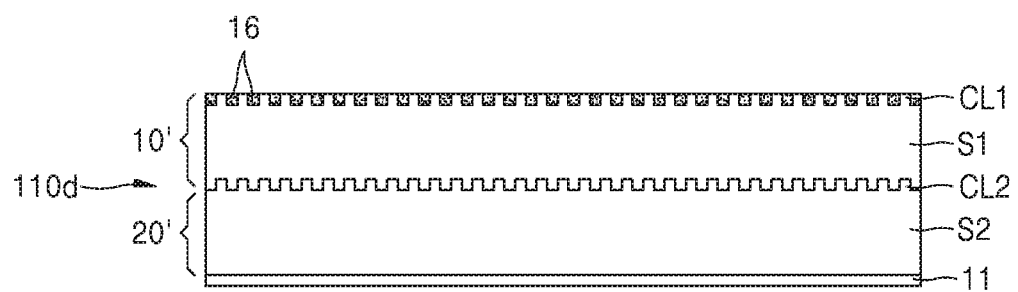
FIG. 14 is a schematic cross-sectional view of a configuration of a light guide structure of a backlight unit according to another example embodiment.

FIG. 14 is a schematic cross-sectional view of a configuration of a light guide structure 110d of the backlight unit 100 according to another example embodiment. Referring to FIG. 14, the light guide structure 110d may include a first light guide layer 10' and the second light guide layer 20'. The first light guide layer 10' may include the first substrate S1 and the first coupler layer CL1 disposed on the upper surface of the first substrate S1. Furthermore, the second light guide layer 20' may include the second substrate S2 and the second coupler layer CL2 disposed on the upper surface of the second substrate S2. The first substrate S1 may be disposed above the second substrate S2 and the lower surface of the first substrate S1 may have a pattern shape complementary to the cyclic pattern of the second coupler layer CL2. Furthermore, the polymer layer 16, as a protective layer and a planarization layer, may be filled between the periodic patterns of the first coupler layer CL1. As illustrated in FIG. 14, a coupler layer may be formed on the upper surface of the first substrate S1. In this case, the number of substrates and the number of coupler layers in the light guide structure 100d may be the same.

Figure 15:
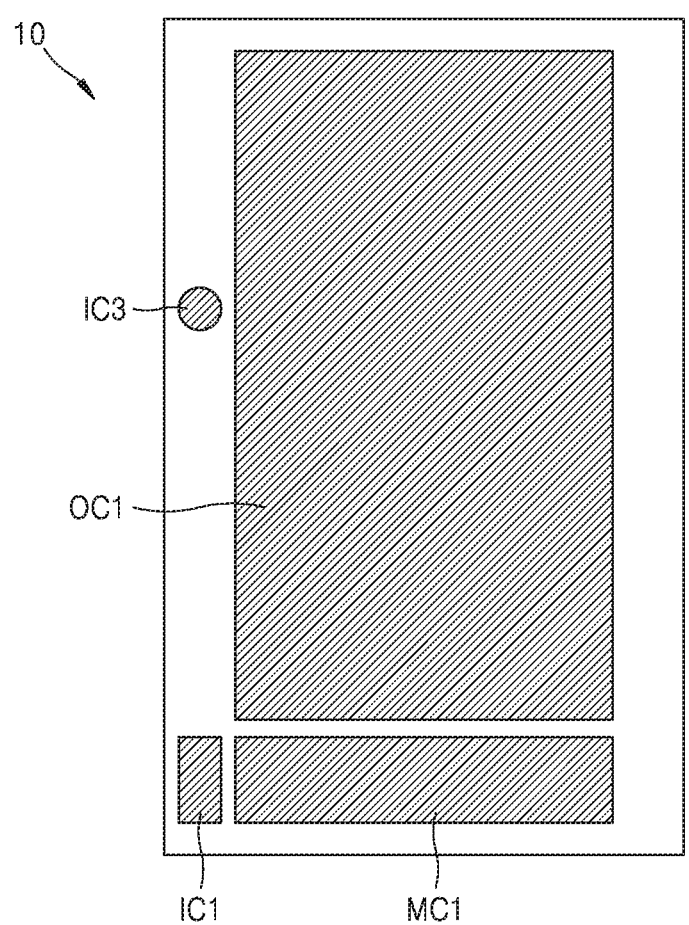
FIG. 15 is a schematic plan view of a configuration of a first light guide layer of a backlight unit according to another example embodiment.
Figure 16:
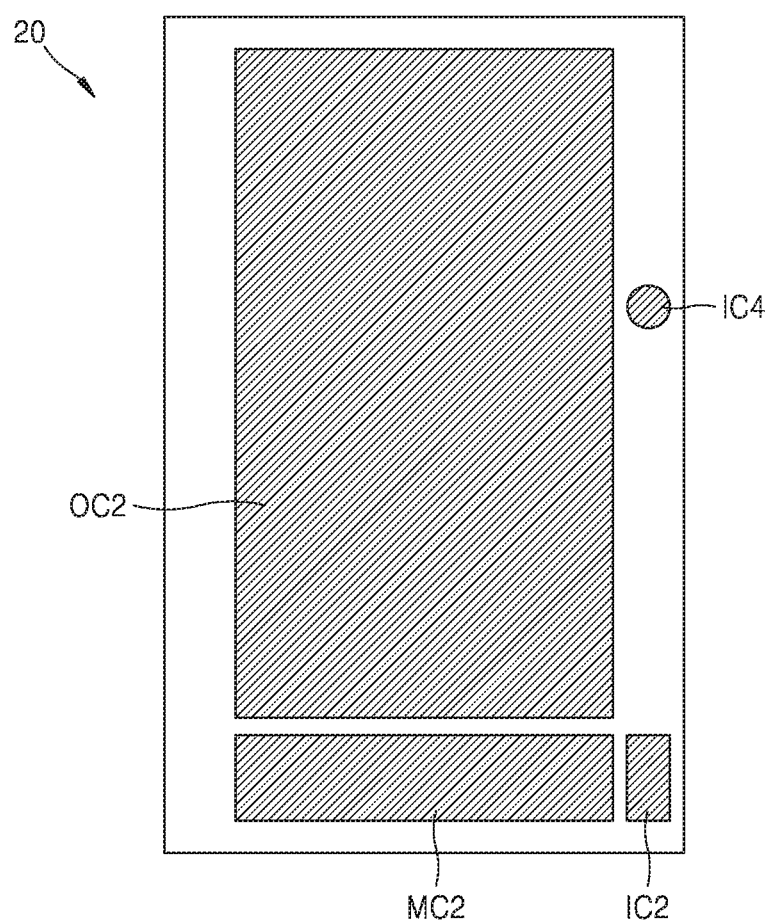
FIG. 16 is a schematic plan view of a configuration of a second light guide layer of a backlight unit according to another example embodiment.

FIG. 15 is a schematic plan view of a configuration of the first light guide layer 10 of the backlight unit 100 according to another example embodiment. FIG. 16 is a schematic plan view of a configuration of the second light guide layer 20 of the backlight unit 100 according to another example embodiment. In the example embodiments of FIGS. 2 to 6, all of the first to fourth input couplers IC1, IC2, IC3, and IC4 are disposed in the second light guide plate 20. However, embodiments are not limited thereto. For example, as illustrated in FIG. 15, the first input coupler IC1 and the third input coupler IC3 may be disposed in the first light guide plate 10, and the second input coupler IC2 and the fourth input coupler IC4 may be disposed in the second light guide plate 20. In other words, the first input coupler IC1 and the third input coupler IC3 may be disposed on the first coupler layer CL1 of the first light guide plate 10, and the second input coupler IC2 and the fourth input coupler IC4 may be disposed on the second coupler layer CL2 of the second light guide plate 20.

Figure 17:
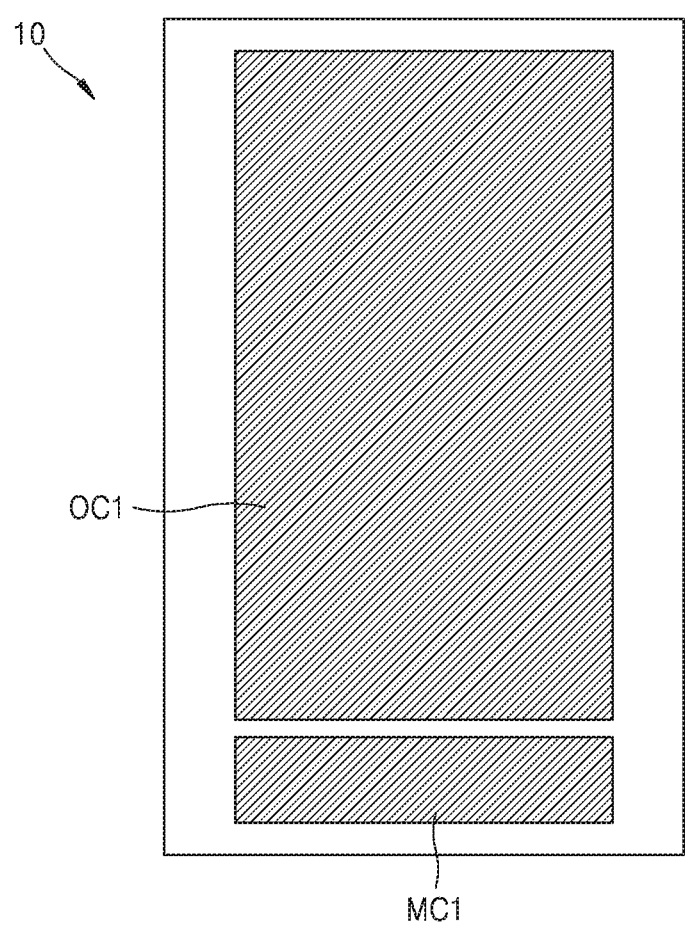
FIG. 17 is a schematic plan view of a configuration of a first light guide layer of a backlight unit according to another example embodiment.
Figure 18:
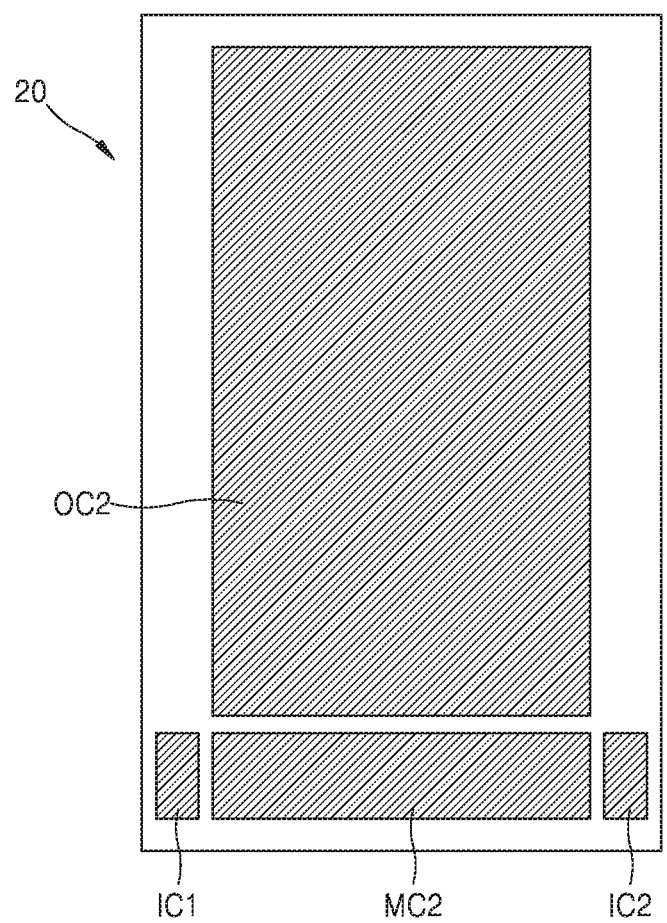
FIG. 18 is a schematic plan view of a configuration of a second light guide layer of a backlight unit according to another example embodiment.
Figure 19:
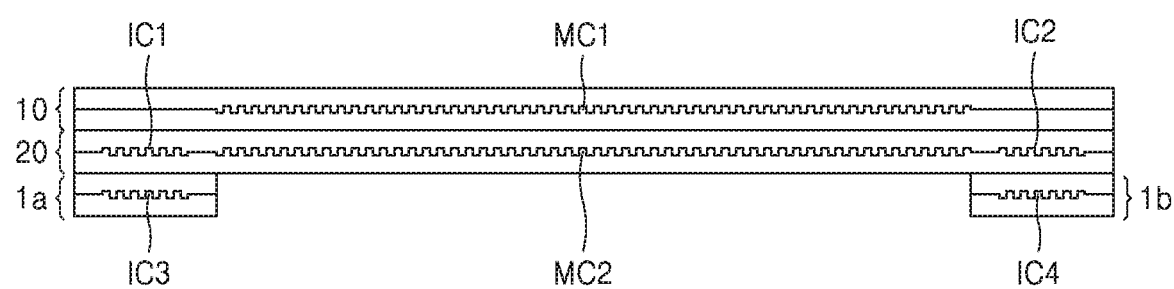
FIG. 19 is a schematic cross-sectional view of a configuration of a light guide structure according to an example embodiment, in which the first light guide layer of FIG. 17 and the second light guide layer of FIG. 18 are bonded to each other.

FIG. 17 is a schematic plan view of a configuration of the first light guide layer 10 of the backlight unit 100 according to another example embodiment. FIG. 18 is a schematic plan view of a configuration of the second light guide layer 20 of the backlight unit 100 according to another example embodiment. FIG. 19 is a schematic cross-sectional view of a configuration of a light guide structure according to an example embodiment, in which the first light guide layer 10 of FIG. 17 and the second light guide layer 20 of FIG. 18 are bonded to each other. In particular, FIG. 19 is a cross-sectional view of the light guide structure taken along the first expansion coupler MC1 and the second expansion coupler MC2 to reveal the first expansion coupler MC1 and the second expansion coupler MC2.

Referring to FIGS. 17 to 19, an input coupler may not be disposed in the first light guide layer 10, and only the first input coupler IC1 and the second input coupler IC2 may be disposed in the second light guide layer 20 at both sides of the second expansion coupler MC2 in the y-axis direction. The third input coupler IC3 and fourth input coupler IC4 may be disposed in a separate light guide layer adjacent to the lower surface of the second light guide layer 20. For example, the third input coupler IC3 may be disposed in a first input light guide layer 1*a* that is disposed adjacent to the lower surface of the second light guide layer 20 to face the first input coupler IC1 in the z-axis direction, and the fourth input coupler IC4 may be disposed in a second input light guide layer 1*b* that is adjacent to the lower surface of the second light guide layer 20 to face the second input coupler IC2 in the z-axis direction as illustrated in FIG. 19.

Figure 20:
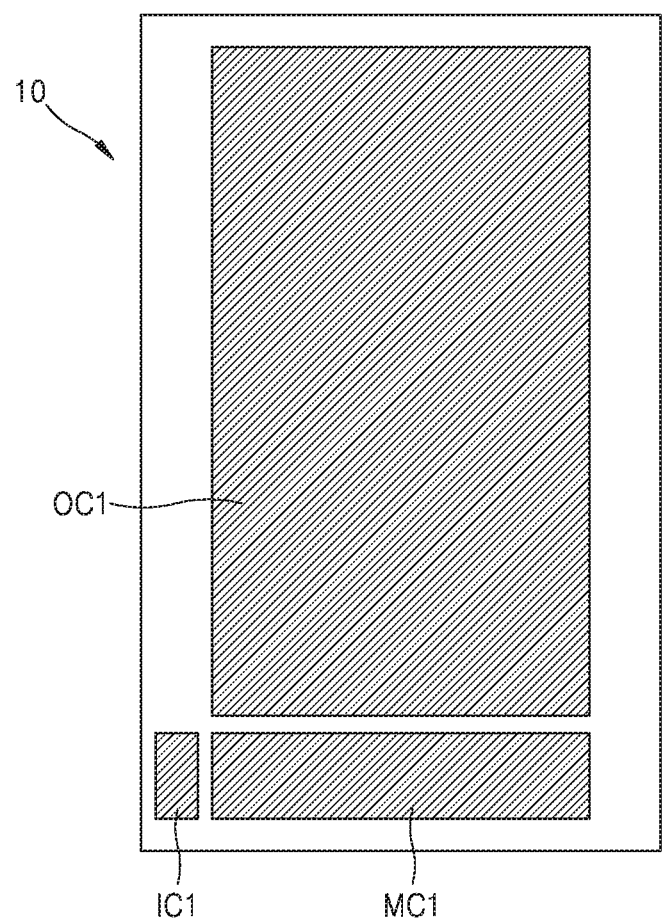
FIG. 20 is a schematic plan view of a configuration of a first light guide layer of a backlight unit according to another example embodiment.
Figure 21:
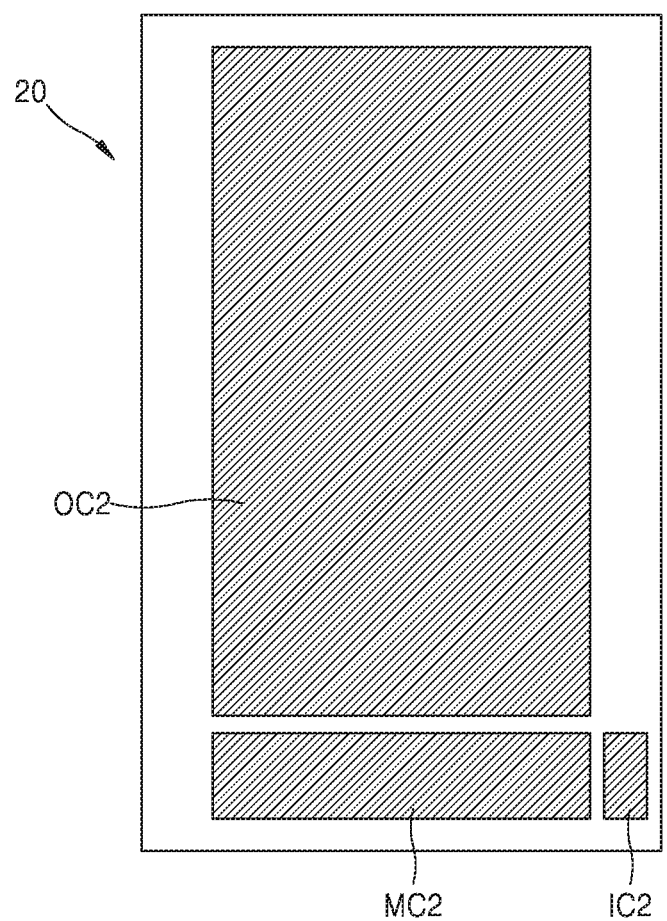
FIG. 21 is a schematic plan view of a configuration of a second light guide layer of a backlight unit according to another example embodiment.
Figure 22:
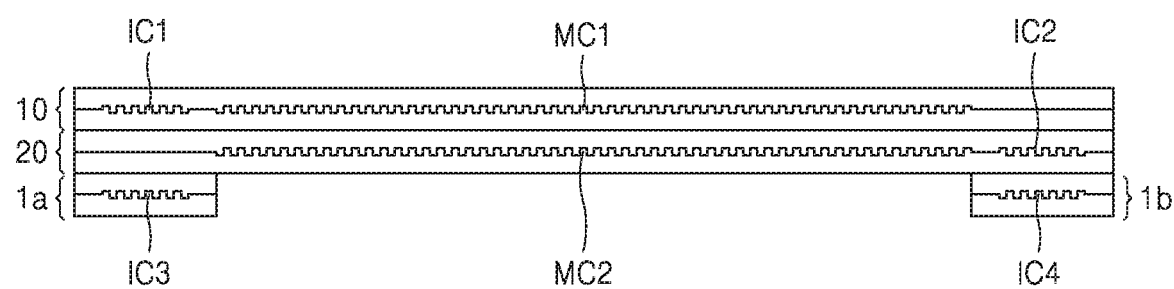
FIG. 22 is a schematic cross-sectional view of a configuration of a light guide structure according to an example embodiment, in which the first light guide layer of FIG. 17 and the second light guide layer of FIG. 18 are bonded to each other.

FIG. 20 is a schematic plan view of a configuration of the first light guide layer 10 of the backlight unit 100 according to another example embodiment. FIG. 21 is a schematic plan view of a configuration of the second light guide layer 20 of the backlight unit 100 according to another example embodiment. FIG. 22 is a schematic cross-sectional view of a configuration of a light guide structure according to an example embodiment, in which the first light guide layer 10 of FIG. 17 and the second light guide layer 20 of FIG. 18 are bonded to each other. In particular, FIG. 22 is a cross-sectional view taken along the first expansion coupler MC1 and the second expansion coupler MC2 to reveal the first expansion coupler MC1 and second expansion coupler MC2.

Referring to FIGS. 20 to 22, in the first light guide layer 10, the first input coupler IC1 may be disposed at the left side of the first expansion coupler MC1 in the −y-axis direction, and in the second light guide layer 20, the second input coupler IC2 may be disposed at the right side of the second expansion coupler MC2 in the +y-axis direction. The third input coupler IC3 and fourth input coupler IC4 may be disposed in a separate light guide layer adjacent to the lower surface of the second light guide layer 20. For example, the third input coupler IC3 may be disposed in the first input light guide layer 1*a* that is disposed adjacent to the lower surface of the second light guide layer 20 to face the first input coupler IC1 in the z-axis direction, and the fourth input coupler IC4 may be disposed in the second input light guide layer 1*b* that is disposed adjacent to the lower surface of the second light guide layer 20 to face the second input coupler IC2 in the z-axis direction.

In order for the holographic display apparatus 200 to reproduce a color holographic image, the backlight unit 100 may provide red illumination light, green illumination light, and blue illumination light to the spatial light modulator 210. To this end, the backlight unit 100 may include a plurality of light guide structures for respectively providing red illumination light, green illumination light, and blue illumination light. For example, FIG. 23 schematically illustrates a configuration of the backlight unit 100 according to an example embodiment, in which the backlight unit provides red illumination light, green illumination light, and blue illumination light.

Figure 23:
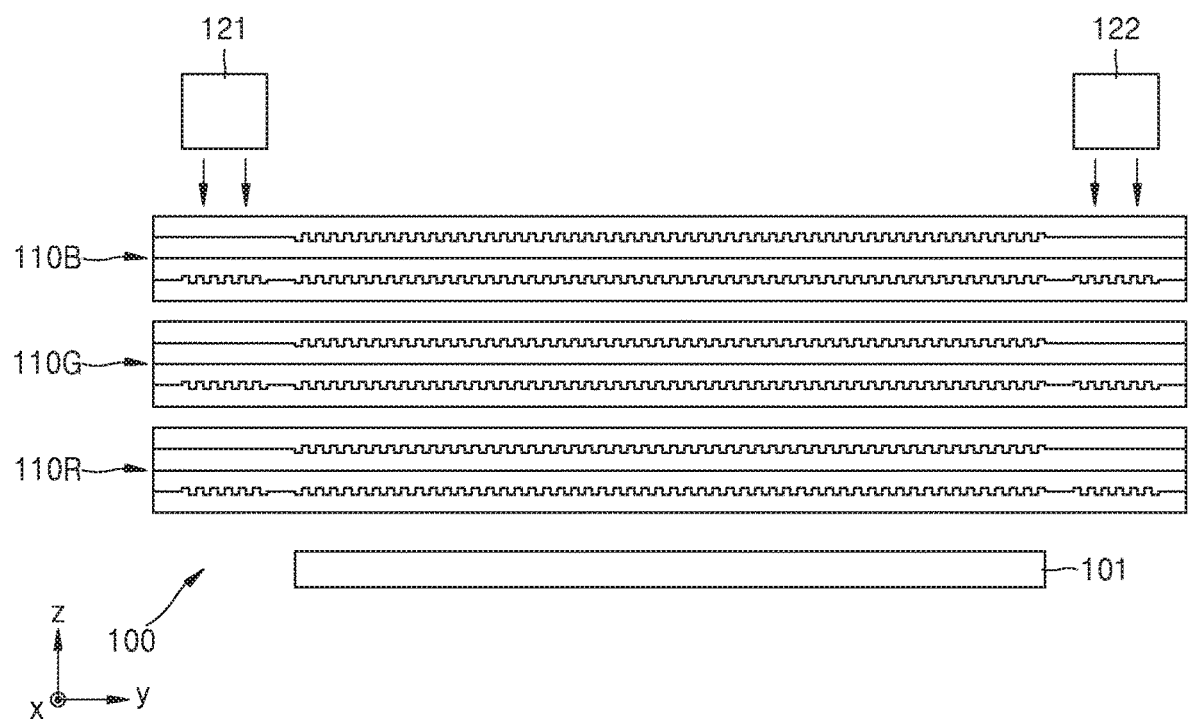
FIG. 23 schematically illustrates a configuration of a backlight unit according to an example embodiment, in which the backlight unit provides red illumination light, green illumination light, and blue illumination light.

Referring to FIG. 23, the backlight unit 100 may include a first light guide structure 110R that may provide red illumination light, a second light guide structure 110G that may provide green illumination light, and a third light guide structure 110B that may provide blue illumination light. Although FIG. 23 illustrates that, in the z-axis direction, the second light guide structure 110G is disposed above the first light guide structure 110R and the third light guide structure 110B is disposed above the second light guide structure 110G, embodiments are not limited thereto and the arrangement order of the first light guide structure 110R, the second light guide structure 110G, and the third light guide structure 110B may be selected differently as necessary. The first light source 121 and the second light source 122 may be disposed above the upper surface of the third light guide structure 110B, respectively at both edges thereof in the y-axis direction. Each of the first light guide structure 110R, the second light guide structure 110G, and the third light guide structure 110B may have the same configuration as that of the above-described light guide structure 110.

Figure 24:
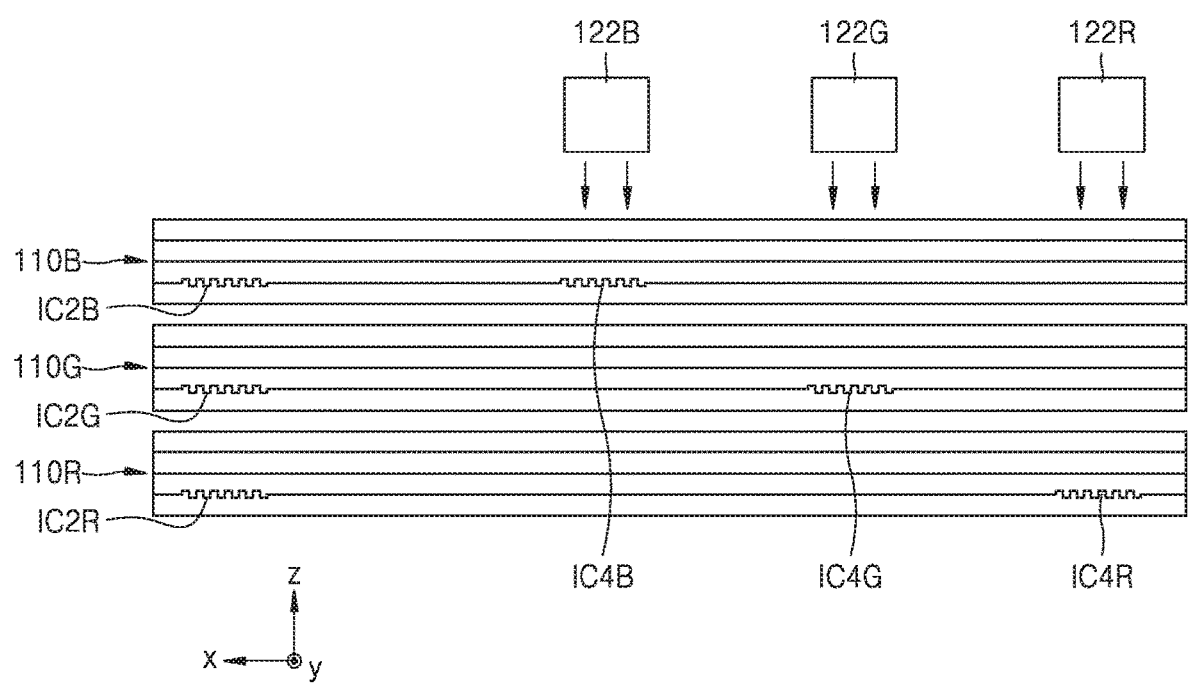
FIG. 24 schematically illustrates an arrangement of a red light source, a green light source, and a blue light source in the backlight unit of FIG. 23.

Furthermore, each of the first light source 121 and the second light source 122 may include a red light source that may emit red light, a green light source that may emit green light, and a blue light source that may emit blue light. For example, FIG. 24 schematically illustrates an arrangement of a red light source, a green light source, and a blue light source in the backlight unit 100 of FIG. 23. In particular, FIG. 24 illustrates the configuration of the backlight unit 100, viewed from a different direction from that of FIG. 23. For example, FIG. 23 illustrates the configuration of the backlight unit 100 viewed from the x-axis direction, and FIG. 24 illustrates the configuration of the backlight unit 100, viewed from the y-axis direction.

Referring to FIG. 24, the second light source 122 may include a red light source 122R, a green light source 122G, and a blue light source 122B. The red light source 122R, the green light source 122G, and the blue light source 122B may be linearly arranged in the x-axis direction above the upper surface of the third light guide structure 110B. At the opposite side of the first light guide structure 110R, the second light guide structure 110G, and the third light guide structure 110B viewed in FIG. 24, the first light source 121 may also include a red light source, a green light source, and a blue light source linearly arranged in the x-axis direction.

The first light guide structure 110R may include a second input coupler IC2R to couple red light and a fourth input coupler IC4R to couple red light. The second light guide structure 110G may include a second input coupler IC2G to couple green light and a fourth input coupler IC4G to couple green light. The third light guide structure 110B may include a second input coupler IC2B to couple blue light and a fourth input coupler IC4B to couple blue light. At the opposite side of the first light guide structure 110R, the second light guide structure 110G, and the third light guide structure 110B viewed in FIG. 24, the first light guide structure 110R may include a first input coupler to couple red light and a third input coupler to couple red light, the second light guide structure 110G may include a first input coupler to couple green light and a third input coupler to couple green light, and the third light guide structure 110B may include a first input coupler to couple blue light and a third input coupler to couple blue light.

The fourth input coupler IC4R to couple red light, which guides the red light emitted from the red light source 122R to the inside of the first light guide structure 110R, is disposed to face the red light source 122R in the z-axis direction. The fourth input coupler IC4G to couple green light, which guides the green light emitted from the green light source 122G to the inside of the second light guide structure 110G, is disposed to face the green light source 122G in the z-axis direction. Furthermore, the fourth input coupler IC4B to couple blue light, which guides the blue light emitted from the blue light source 122B to the inside of the third light guide structure 110B, is disposed to face the blue light source 122B in the z-axis direction. Accordingly, the fourth input coupler IC4R to couple red light, the fourth input coupler IC4G to couple green light, and the fourth input coupler IC4B to couple blue light are disposed at different positions in the x-axis direction. Then, the first light guide structure 110R may provide collimated red illumination light to the spatial light modulator 210 by guiding and expanding the red light emitted from the red light source 122R. The second light guide structure 110G may provide collimated green illumination light to the spatial light modulator 210 by guiding and expanding the green light emitted from the green light source 122G, and the third light guide structure 110B may provide collimated blue illumination light to the spatial light modulator 210 by guiding and expanding the blue light emitted from the blue light source 122B.

While the above-described backlight unit and the holographic display apparatus including the backlight has been particularly shown and described with reference to example embodiments thereof, it will be understood by those of ordinary skill in the art that various changes in form and details may be made therein without departing from the spirit and scope of the disclosure as defined by the appended claims. The example embodiments should be considered in descriptive sense only and not for purposes of limitation. Therefore, the scope of the disclosure is defined not by the detailed description of the disclosure but by the appended claims, and all differences within the scope will be construed as being included in the present disclosure.

What is claimed is:

1. A backlight unit comprising:
   a light source configured to emit light; and
   a light guide structure configured to guide the light emitted from the light source, the light guide structure comprising:
     a first coupler layer; and
     a second coupler layer facing the first coupler layer,
   wherein the first coupler layer comprises:
     a first output coupler configured to expand light traveling inside the light guide structure in a first direction and output the expanded light in the first direction to the outside of the light guide structure; and
     a first expansion coupler configured to expand the light traveling inside the light guide structure in a second direction perpendicular to the first direction and provide the expanded light in the second direction to the first output coupler, and
   wherein the second coupler layer comprises:
     a second output coupler configured to expand light traveling inside the light guide structure in the first direction and output the expanded light to the outside of the light guide structure; and
     a second expansion coupler configured to expand light traveling inside the light guide structure in the second direction and provide the expanded light to the second output coupler,
   wherein the light guide structure further comprises:
     a first input coupler disposed adjacent to a first side of the second expansion coupler in the second direction and configured to provide light to the first side of the second expansion coupler; and
     a second input coupler disposed adjacent to a second side of the second expansion coupler in the second direction and configured to provide light to the second side of the second expansion coupler,
   wherein the second side is opposite to the first side in the second direction, and
   wherein the light is repeatedly incident on the first expansion coupler and the second expansion coupler while the light travels inside the light guide structure.

2. The backlight unit of claim 1, wherein the first output coupler faces the second output coupler, and the first expansion coupler faces the second expansion coupler.

3. The backlight unit of claim 2, wherein the first expansion coupler is configured to couple a portion of light incident at a first angle and provide the coupled light incident at the first angle to the first output coupler, and to transmit light incident at an angle different from the first angle, and
   the second expansion coupler is configured to couple a portion of light incident at a second angle different from the first angle and provide the coupled light incident at the second angle to the second output coupler, and to transmit light incident at an angle different from the second angle.

4. The backlight unit of claim 3, wherein the first angle and the second angle have a same size and opposite signs with respect to a surface normal to the light guide structure.

5. The backlight unit of claim 3, wherein the first expansion coupler is disposed adjacent to a side surface of the first output coupler in the first direction, and
   wherein the second expansion coupler is disposed adjacent to a side surface of the second output coupler in the first direction.

6. The backlight unit of claim 1, wherein the first input coupler and the second input coupler are disposed in the first coupler layer.

7. The backlight unit of claim 1, wherein the first input coupler is disposed in the first coupler layer and the second input coupler is disposed in the second coupler layer.

8. The backlight unit of claim 1, wherein the light guide structure further comprises:
   a third input coupler disposed adjacent to a side surface of the first input coupler in the first direction and configured to provide light to the first input coupler; and
   a fourth input coupler disposed adjacent to a side surface of the second input coupler in the first direction and configured to provide light to the side surface of the second input coupler.

9. The backlight unit of claim 8, wherein the third input coupler and the fourth input coupler are disposed in the first coupler layer.

10. The backlight unit of claim 8, wherein the third input coupler is disposed in the first coupler layer and the fourth input coupler is disposed in the second coupler layer.

11. The backlight unit of claim 8, wherein the light source comprises a first light source configured to emit light to the first input coupler or the third input coupler, and a second light source configured to emit light to the second input coupler or the fourth input coupler.

12. The backlight unit of claim 11, wherein a difference between a center wavelength of the light emitted from the first light source and a center wavelength of the light emitted from the second light source is greater than 0 nm and less than or equal to 10 nm.

13. The backlight unit of claim 1, wherein the light guide structure further comprises:
a first substrate disposed above the first coupler layer;
a second substrate disposed under the first coupler layer;
a third substrate disposed above the second coupler layer and under the second substrate; and
a fourth substrate disposed under the second coupler layer.

14. The backlight unit of claim 13, wherein the light guide structure further comprises a semi-transmissive layer disposed between the second substrate and the third substrate and configured to reflect a portion of incident light and transmit a remaining portion of the incident light.

15. The backlight unit of claim 13, wherein the light guide structure further comprises a reflection plate disposed at a lower surface of the fourth substrate.

16. The backlight unit of claim 13, wherein a sum of a thickness of the first substrate and a thickness of the second substrate is different from a sum of a thickness of the third substrate and a thickness of the fourth substrate.

17. The backlight unit of claim 13, wherein the first substrate has a thickness of about 15 nm or less and comprises SiO2.

18. The backlight unit of claim 13, wherein the first output coupler and the first expansion coupler respectively have a grating structure in which a plurality of recesses and a plurality of protrusions are periodically disposed, and
wherein the light guide structure further comprises a polymer filling the plurality of recesses of the grating structure.

19. The backlight unit of claim 1, wherein the light guide structure comprises:
a first substrate disposed above the first coupler layer;
a second substrate disposed under the first coupler layer and above the second coupler layer; and
a third substrate disposed under the second coupler layer.

20. The backlight unit of claim 19, wherein a sum of a thickness of the first substrate and a thickness of the second substrate is different from a thickness of the third substrate.

21. The backlight unit of claim 1, wherein the light source comprises:
a first wavelength light source configured to emit light of a first wavelength;
a second wavelength light source configured to emit light of a second wavelength that is different from the first wavelength; and
a third wavelength light source configured to emit light of a third wavelength that is different from the first wavelength and the second wavelength, respectively.

22. The backlight unit of claim 21, wherein the light guide structure comprises:
a first light guide structure configured to guide the light of the first wavelength emitted from the first wavelength light source;
a second light guide structure configured to guide the light of the second wavelength emitted from the second wavelength light source; and
a third light guide structure configured to guide the light of the third wavelength emitted from the third wavelength light source.

23. A holographic display apparatus comprising:
a backlight unit configured to provide collimated illumination light; and
a spatial light modulator configured to generate a holographic image by modulating the collimated illumination light received from the backlight unit,
wherein the backlight unit comprises:
a light source configured to emit light; and
a light guide structure configured to guide the light emitted from the light source,
wherein the light guide structure comprises:
a first coupler layer; and
a second coupler layer facing the first coupler layer,
wherein the first coupler layer comprises:
a first output coupler configured to expand light traveling inside the light guide structure in a first direction and output the expanded light in the first direction to the outside of the light guide structure; and
a first expansion coupler configured to expand the light traveling inside the light guide structure in a second direction perpendicular to the first direction and provide the expanded light in the second direction to the first output coupler, and
wherein the second coupler layer comprises:
a second output coupler configured to expand light traveling inside the light guide structure in the first direction and output the expanded light in the first direction to the outside of the light guide structure; and
a second expansion coupler configured to expand light traveling inside the light guide structure in the second direction and provide the expanded light in the second direction to the second output coupler,
wherein the light guide structure further comprises:
a first input coupler disposed adjacent to a first side of the second expansion coupler in the second direction and configured to provide light to the first side of the second expansion coupler; and
a second input coupler disposed adjacent to a second side of the second expansion coupler in the second direction and configured to provide light to the second side of the second expansion coupler,
wherein the second side is opposite to the first side in the second direction, and
wherein the light is repeatedly incident on the first expansion coupler and the second expansion coupler while the light travels inside the light guide structure.

24. A backlight unit comprising:
a light source configured to emit light; and
a light guide structure configured to guide the light emitted from the light source,
wherein the light source comprises:
a first light source configured to emit a first light and provided on a first edge of an upper surface of the light guide structure; and
a second light source configured to emit a second light and provided on a second edge of the upper surface of the light guide structure,
wherein the light guide structure comprises:
a first grating layer comprising:
a first output grating configured to expand the first light traveling inside the light guide structure in a first direction and output the expanded first light in the first direction to the outside of the light guide structure; and
a first expansion grating configured to expand the first light traveling inside the light guide structure in a second direction perpendicular to the first direction and provide the expanded first light in the second direction to the first output grating, and
a second grating layer comprising:
a second output grating configured to expand the second light traveling inside the light guide structure in the first direction and output the expanded second light in the first direction to the outside of the light guide structure; and a second expansion grating configured to expand the second light traveling inside the light guide structure in the second direction and provide the expanded second light in the second direction to the second output grating, the second grating layer being provided on a lower surface of the first grating layer, wherein the light guide structure further comprises:
a first input coupler disposed adjacent to a first side of the second expansion grating in the second direction and configured to provide light to the first side of the second expansion grating; and
a second input coupler disposed adjacent to a second side of the second expansion grating in the second direction and configured to provide light to the second side of the second expansion grating, wherein the second side is opposite to the first side in the second direction, and wherein the light is repeatedly incident on the first expansion grating and the second expansion grating while the light travels inside the light guide structure.

25. The backlight unit of claim 24, wherein the light guide structure further comprises:
a first substrate disposed above the first grating layer;
a second substrate disposed under the first grating layer;
a third substrate disposed above the second grating layer and under the second substrate; and
a fourth substrate disposed under the second grating layer.

26. The backlight unit of claim 25, wherein a sum of a thickness of the first substrate and a thickness of the second substrate is different from a sum of a thickness of the third substrate and a thickness of the fourth substrate.

* * * * *